(12) United States Patent
Sakata

(10) Patent No.: US 9,045,088 B2
(45) Date of Patent: Jun. 2, 2015

(54) VEHICLE OUTSIDE MIRROR DEVICE

(71) Applicant: ICHIKOH INDUSTRIES, LTD., Isehara-shi, Kanagawa-ken (JP)

(72) Inventor: Ikuo Sakata, Isehara (JP)

(73) Assignee: ICHIKOH INDUSTRIES, LTD., Isehara-shi (JP)

( * ) Notice: Subject to any disclaimer, the term of this patent is extended or adjusted under 35 U.S.C. 154(b) by 178 days.

(21) Appl. No.: 13/759,256

(22) Filed: Feb. 5, 2013

(65) Prior Publication Data

US 2013/0258510 A1   Oct. 3, 2013

(30) Foreign Application Priority Data

Mar. 28, 2012 (JP) ................................. 2012-074891

(51) Int. Cl.
G02B 7/18 (2006.01)
B60R 1/06 (2006.01)
B60R 1/074 (2006.01)
B60R 1/076 (2006.01)

(52) U.S. Cl.
CPC . *B60R 1/06* (2013.01); *B60R 1/074* (2013.01); *B60R 1/076* (2013.01)

(58) Field of Classification Search
CPC ............ B60R 1/02; B60R 1/06; B60R 1/066; B60R 1/07; B60R 1/072; B60R 1/08
USPC .................................. 359/841, 871, 872, 877
See application file for complete search history.

(56) References Cited

U.S. PATENT DOCUMENTS 6,322,221 B1 *  11/2001  van de Loo ................... 359/841

FOREIGN PATENT DOCUMENTS

| EP | 2 042 375 B1 | 4/2009 |
| EP | 2 366 589 B1 | 9/2011 |
| EP | 2 368 762 A1 | 9/2011 |
| JP | 2001-287594 A | 10/2001 |

* cited by examiner

*Primary Examiner* — Euncha Cherry
(74) *Attorney, Agent, or Firm* — Foley & Lardner LLP

(57) ABSTRACT

According to the present invention, with regard to a plurality of notch portions, a plurality of tilt faces are provided for a respective one of the notch portions. As a result, the present invention is capable of lowering a facial pressure of a respective one of a plurality of tilt faces of one notch portion more remarkably than a facial pressure of one tilt face of one notch portion. As a result, the present invention is capable of reducing a frictional wear and tear of a tilt face without a need to use any other component.

3 Claims, 16 Drawing Sheets

(A)

(B)

(A)

(B)

(A)

(B)

(A)

(B)

VEHICLE OUTSIDE MIRROR DEVICE

CROSS REFERENCE TO RELATED APPLICATIONS

This application claims priority of Japanese Patent Application No. 2012-074891 filed on Mar. 28, 2012. The contents of the application are incorporated herein by reference in their entirety.

BACKGROUND OF THE INVENTION

1. Field of the Invention

The present invention relates to a vehicle outside mirror device in which a mirror assembly is rotatably mounted to a shaft via a buffering mechanism.

2. Description of the Related Art

A vehicle outside mirror device of such type is conventionally known (for example, Japanese Unexamined Patent Application Publication No. 2001-287594). Hereinafter, a conventional vehicle outside mirror device will be described. The conventional vehicle outside mirror device is provided in such a manner that in a case where a door mirror visor is subjected to an external force, and a casing is then subjected to an external force that is equal to or greater than a predetermined value in another direction, a casing top runs aground a stand top and then a mirror rotates to a forward tilt location side.

However, the conventional outside mirror device described previously uses a cutting proof member that is provided as any other component in order to prevent a frictional wear and tear between a casing top and a stand top of a buffering mechanism.

SUMMARY OF THE INVENTION

The present invention has been made in order to solve the above described problem that the conventional vehicle outside mirror device needs to use any other component in order to prevent a frictional wear and tear associated with the buffering mechanism.

A vehicle outside mirror device according to a first aspect of the present invention comprising:
 a base that is fixed to a vehicle body;
 an electrically driven storage unit; and
 a mirror assembly that is mount to the base so as to be rotatable via the electrically driven storage unit,
 wherein the electrically driven storage unit comprises a shaft that is fixed to the base, a casing which is mounted to the shaft so as to be rotatable and to which the mirror assembly is mounted, a first buffering mechanism, a motor, a rotation force transmission mechanism, and a second buffering mechanism,
 wherein the first buffering mechanism is a mechanism which is made of a first member, a second member that is the casing, and a spring, and in which a notch portion having a tilt face is provided in a respective one of the first member and the second member, when the mirror assembly is positioned between a use location and a storage location, the tilt face of the first member and the tilt face of the second member are caused to abut against each other by means of a spring force of the spring, and when the mirror assembly rotates forward from the use location with respect to the shaft for buffering, the tilt face of the second member runs aground along the tilt face of the first member against the spring force of the spring,
 wherein the second buffering mechanism is a mechanism which is made of a first member that is disabled from rotating with respect to the shaft, a second member that is rotatable with respect to the shaft, and the spring, and in which a notch portion having a tilt face is provided in a respective one of the first member and the second member, the tilt face of the first member and the tilt face of the second member are caused to abut against each other by means of the spring force of the spring, when the mirror assembly rotates with a force that is equal to or greater than an electrically driven rotation force of the electrically driven storage unit, the tilt face of the second member runs aground along the tilt face of the first member against the spring force of the spring, and
 wherein with regard to at least either one of a set of the notch portion of the first member and the notch portion of the second member of the first buffering mechanism and a set of the notch portion of the first member and the notch portion of the second member of the second buffering mechanism, a plurality of the tilt faces are provided for a respective one of the notch portions.

A vehicle outside mirror device according to a second aspect of the present invention comprising:
 a base that is fixed to a vehicle body;
 a shaft that is fixed to the base; and
 a mirror assembly that is mounted to the shaft so as to be rotatable via a buffering mechanism,
 wherein the buffering mechanism is a mechanism which is made of a first member that is disabled from rotating with respect to the shaft, a second member that is rotatable with respect to the shaft, and a spring, and in which a notch portion having a tilt face is provided for a respective one of the first member and the second member, when the mirror assembly is positioned in a predetermined location with respect to the shaft, the tilt face of the first member and the tilt face of the second member are caused to abut against each other by means of a spring force of the spring, and when the mirror assembly rotates with respect to the shaft for buffering, the tilt face of the second member runs aground along the tilt face of the first member against the spring force of the spring, and
 wherein with regard to the notch portion of the first member and the notch portion of the second member, a plurality of the tilt faces are provided for a respective one of the notch portions.

A vehicle outside mirror device according to the first aspect of the present invention is provided in such a manner that with regard to a notch portion of a first member and a notch portion of a second member of a first buffering mechanism, a plurality of tilt faces are provided for a respective one of the notch portions, and with respect to a notch portion of a first member and a notch portion of a second member of a second buffering mechanism, a plurality of tilt faces are provided for a respective one of the notch portions. As a result, the vehicle outside mirror device according to the first aspect of the present invention is capable of lowering a facial pressure of a respective one of the plurality of tilt faces of one notch portion more remarkably than a facial pressure of one tilt face of one notch portion; and therefore, it becomes possible to reduce a frictional wear and tear between the tilt faces of the notch portion of the first member and the tilt faces of the notch portion of the second member of the first buffering mechanism and between the tilt faces of the notch portion of the first member and the tilt faces of the notch portion of the second member of the second buffering mechanism without a need to use any other component.

A vehicle outside mirror device according to the second aspect of the present invention is provided in such a manner that with regard to a notch portion of a first member and a notch portion of a second member, a plurality of tilt faces are provided for a respective one of the notch portions. As a result, the vehicle outside mirror is capable of lowering a facial pressure of a respective one of a plurality of tilt faces of one notch portion more remarkably than a facial pressure of one tilt face of one notch portion; and therefore, it becomes possible to reduce a frictional wear and tear between the tilt faces of the first member and the tilt faces of the second member of a buffering mechanism without a need to use any other component.

DESCRIPTION OF THE PREFERRED EMBODIMENTS

Hereinafter, two examples of the embodiments (exemplary embodiments) of the vehicle outside mirror device according to the present invention will be described in detail with reference to the drawings. It is to be noted that the present invention is not limited by these embodiments (exemplary embodiments).

[Description of Configuration of First Embodiment]

Each of FIG. 1 to FIG. 17 shows a first embodiment of the vehicle outside mirror device according to the present invention. Hereinafter, a configuration of the vehicle outside mirror device in the first embodiment will be described.

(Description of Electrically Driven Door Mirror Device 1)

Figure 1:
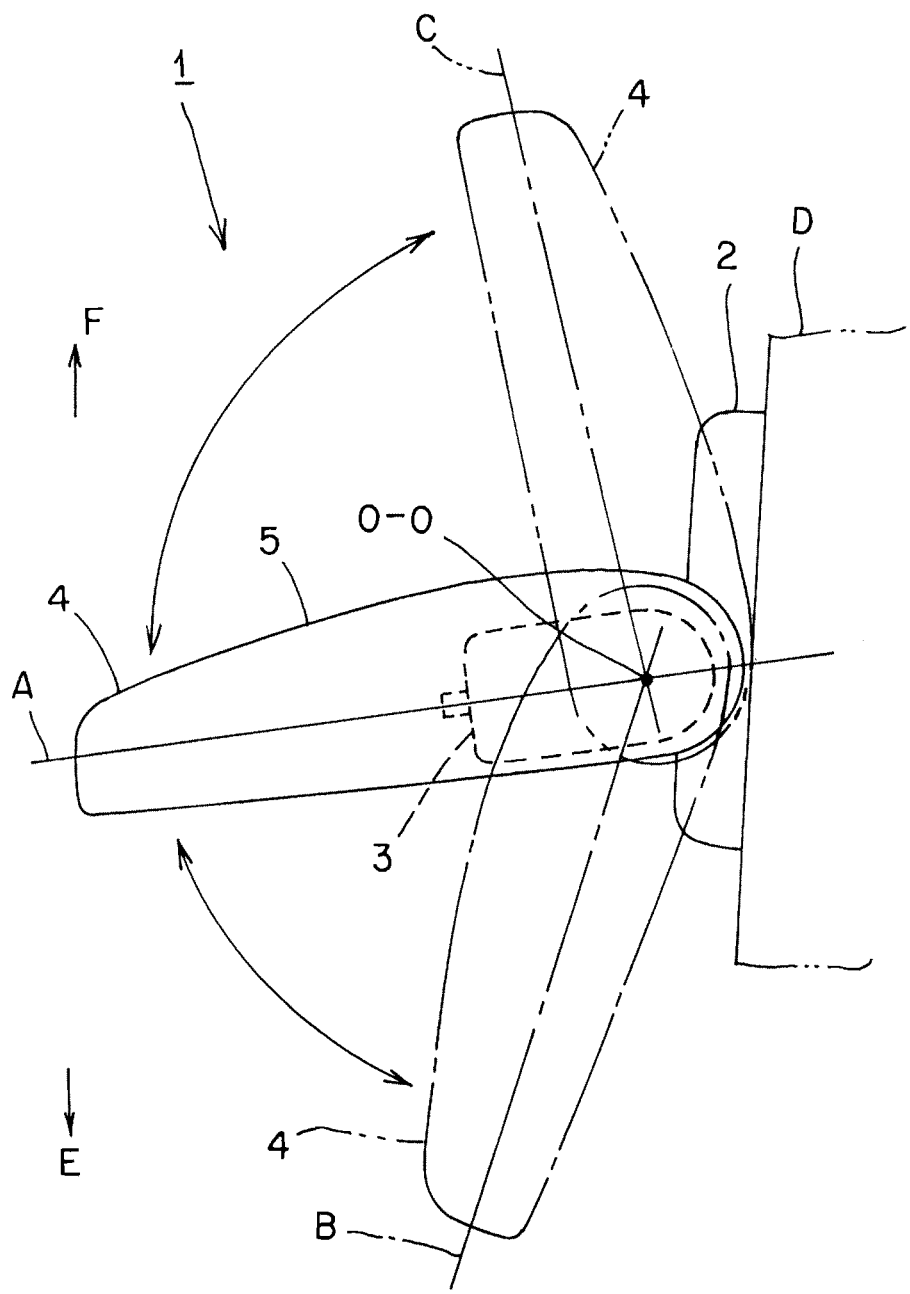
FIG. 1 is a plan view of a use state showing a first embodiment of a vehicle outside mirror device according to the present invention.

In FIG. 1, reference numeral 1 designates a vehicle outside mirror device in the first embodiment, and designates, in this example, an electrically driven door mirror device (an electrically driven storage type door mirror). The electrically driven door mirror device 1 is equipped on a respective one of left and right side doors of a vehicle (the left side door is shown, and the right side door is not shown). Hereinafter, a configuration of the electrically driven storage type door mirror device 1 that is equipped on the left side door D of the vehicle will be described. It is to be noted that the configuration of the electrically driven storage type door mirror device that is equipped on the right side door of the vehicle is substantially identical to that of the electrically driven storage type door mirror device 1 according to the first embodiment, and its related layout is substantially reversed on the left and right; and therefore, a duplicate description is omitted hereinafter.

The electrically driven storage type door mirror device 1, as shown in FIG. 1, is made of a base (a mirror base) 2, an electrically driven storage unit 3, and a mirror assembly 4. The base 2 is fixed to the door D. The mirror assembly 4 is mounted to the base 2 in such a manner as to be rotatable via the electrically driven storage unit 3. In other words, the mirror assembly 4 is mounted to the vehicle body D in such a manner as to be rotatable via the electrically driven storage unit 3 and the base 2.

(Description of Mirror Assembly 4)

The mirror assembly 4, as shown in FIG. 1, is made of a mirror housing 5, a mount bracket (not shown), a power unit (not shown), and a mirror (a mirror unit), although not shown. The mount bracket is mounted in the mirror housing 5. The power unit is mounted to the mount bracket. The mirror is mounted to the power unit in such a manner as to enable tilting upward, downward, leftward, or rightward.

(Description of Electrically Driven Storage Unit 3)

Figure 2:
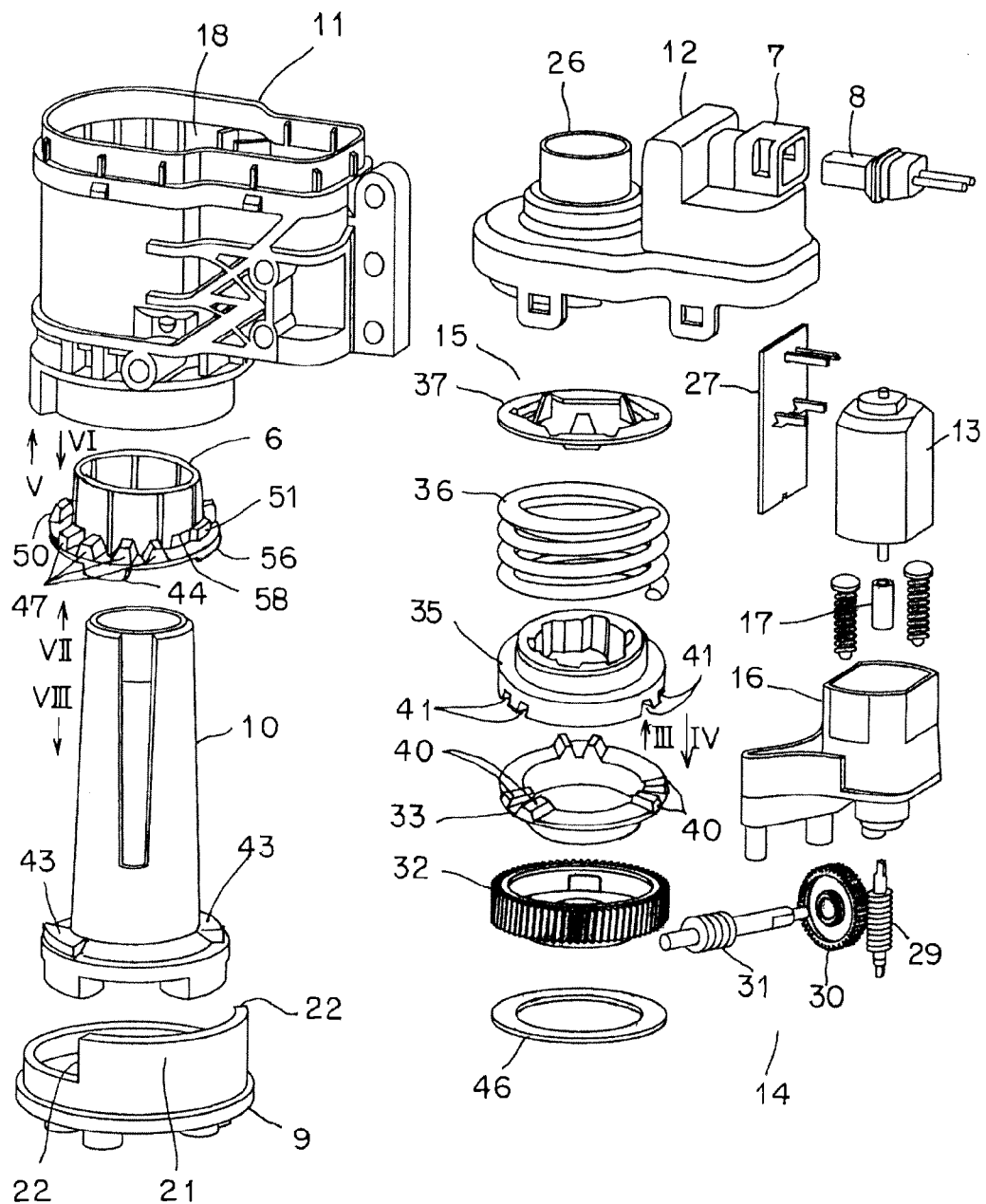
FIG. 2 is an exploded perspective view showing an electrically driven storage unit.
Figure 9:
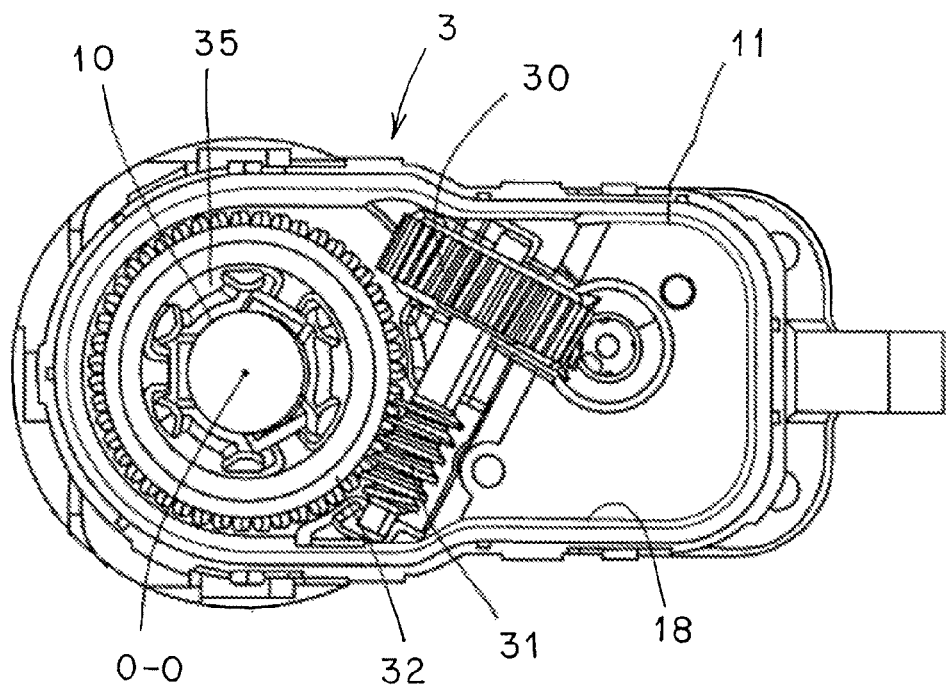
FIG. 9 is a plan view showing the electrically driven storage unit from which a cover is removed.
Figure 10:
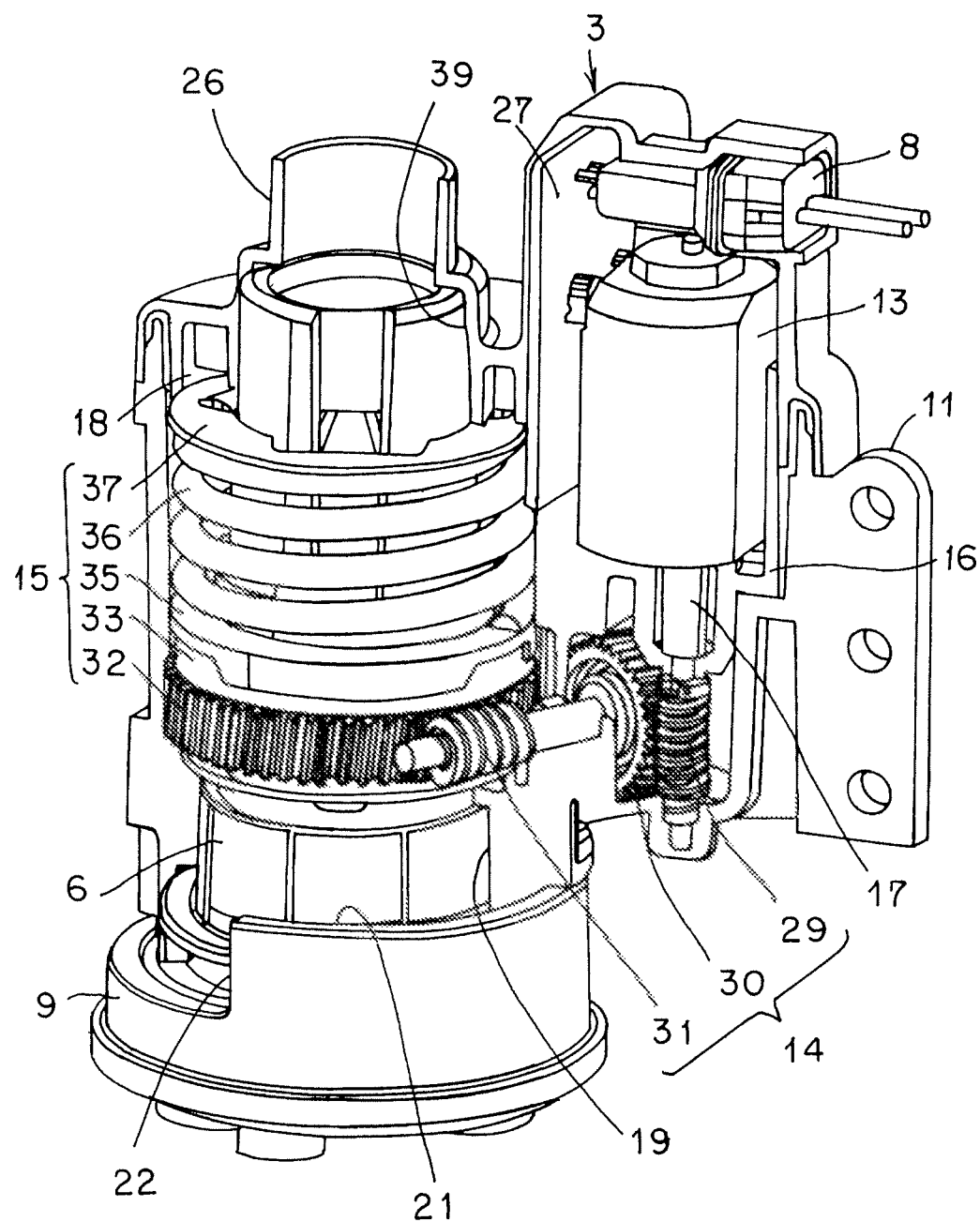
FIG. 10 is a perspective view showing the electrically driven storage unit from which a casing is partially omitted.

The electrically driven storage unit 3, as shown in FIG. 2, FIG. 9, and FIG. 10, is provided with: a shaft holder (a shaft base) 9; a shaft 10; a gear case 1 and a cover 12, a respective one of which serves as a casing; a mirror assembly use location determining mechanism; a mirror assembly rotation range restraining mechanism; a first buffering mechanism 59 (a stopper member 6); a motor 13; and a deceleration mechanism 14 and a clutch mechanism 15, a respective one of which serves as a rotation force transmission mechanism; a second buffering mechanism; a stopper member lock mechanism; and a bearing member 16.

(Description of Shaft Holder 9 and Shaft 10)

The shaft holder 9 is fixed to the base 2. It is to be noted that the shaft holder 9 may be integrally provided on the base 2. The shaft 10 is integrally fixed to a center of one face (a top face) of the shaft holder 9. It is to be noted that the shaft 10 may be integrally provided on the shaft holder 9. The shaft 10 is formed in a hollow shape, and is configured in such a manner that a harness (not shown) is inserted through the shaft.

(Description of Gear Case 1 and Cover 12)

The gear case 11 and the cover 12 are caused to engage with and fixed to each other, and also configure a case in a hollow shape. Insert holes 19 and 39 are respectively provided in the gear case 11 and the cover 12. The shaft 10 is inserted into the insert holes 19 and 39. As a result, the gear case 11 and the cover 12 are mounted to the shaft 10 in such a manner as to be rotatable around a rotation center O-O of the shaft 10.

The mount bracket of the mirror assembly 4 is mounted to the gear case 11. As a result, the mirror assembly 4 is mounted to the shaft 10 via the gear case 11 in such a manner as to be rotatable around the rotation center O-O of the shaft 10.

A harness insert cylinder portion 26 that communicates with the shaft 10 in the hollow shape is integrally provided on the cover 12. A socket portion 7 is provided on the cover 12. A connector 8 that is electrically connected to a power supply (battery) side, although not shown, electrically removably connects to the socket portion 7, and is mounted in such a manner as to be mechanically removable therefrom. A board 27 is mounted to the socket portion 7. The board 27 is electrically connected to the motor 13. A switch circuit adapted to control activation or deactivation of the motor 13 is mounted on the board 27. As a result, the motor 13 is electrically connected to the connector 8 via the board 27 and the socket portion 7.

A housing portion 18 is provided in a respective one of the gear case 11 and the cover 12. In the housing portion 18 of the respective one of the gear case 11 and the cover 12, there are provided: the mirror assembly use location determining mechanism; the mirror assembly rotation range restraining mechanism; the first buffering mechanism 59 (the stopper member 6); the motor 13; the deceleration mechanism 14 and the clutch mechanism 15, a respective one of which serves as the rotation force transmission mechanism; the second buffering mechanism; the stopper member lock mechanism; the bearing member 16; and the board 27, a respective one of which is fixed and housed by means of screw or the like.

(Description of Stopper Member 6)

The stopper member 6 is integrally made of a cylinder portion 20 and a jaw portion 23. The shaft 10 is inserted into the cylinder portion 20. The stopper member 6 is rotatably engaged with the shaft 10. The stopper member 6 is provided between the shaft holder 9 and the gear case 11.

(Description of Mirror Assembly Use Location Determining Mechanism)

Figure 7:
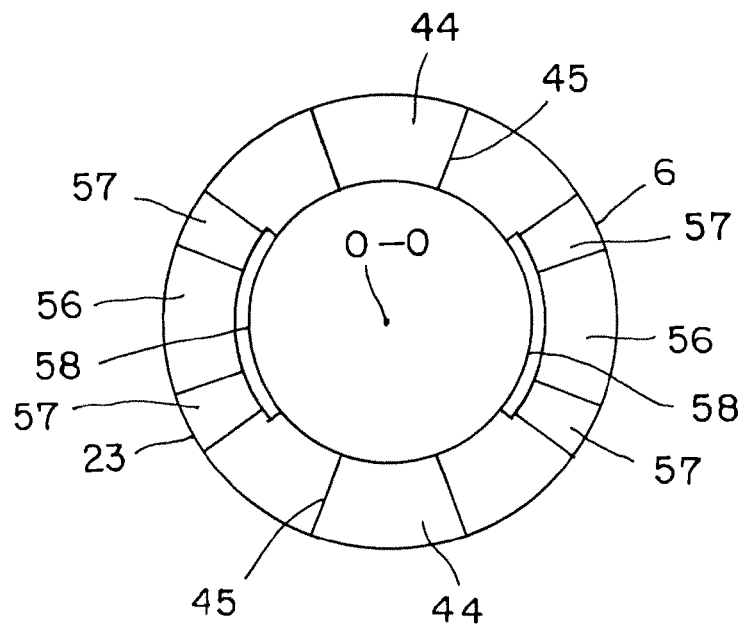
FIG. 7 is a view taken along the line VII in FIG. 2, and is also a bottom view of the stopper member.
Figure 8:
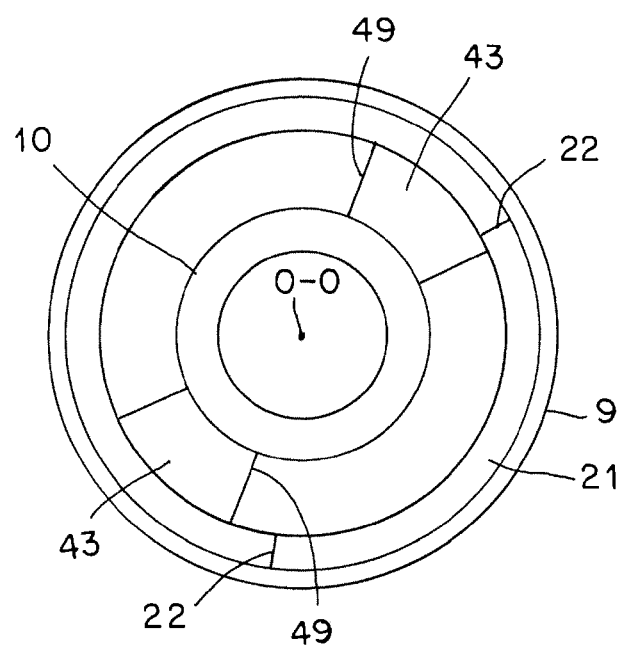
FIG. 8 is a view taken along the line VIII in FIG. 2, and is also a plan view of a shaft and a shaft holder.
Figure 11:
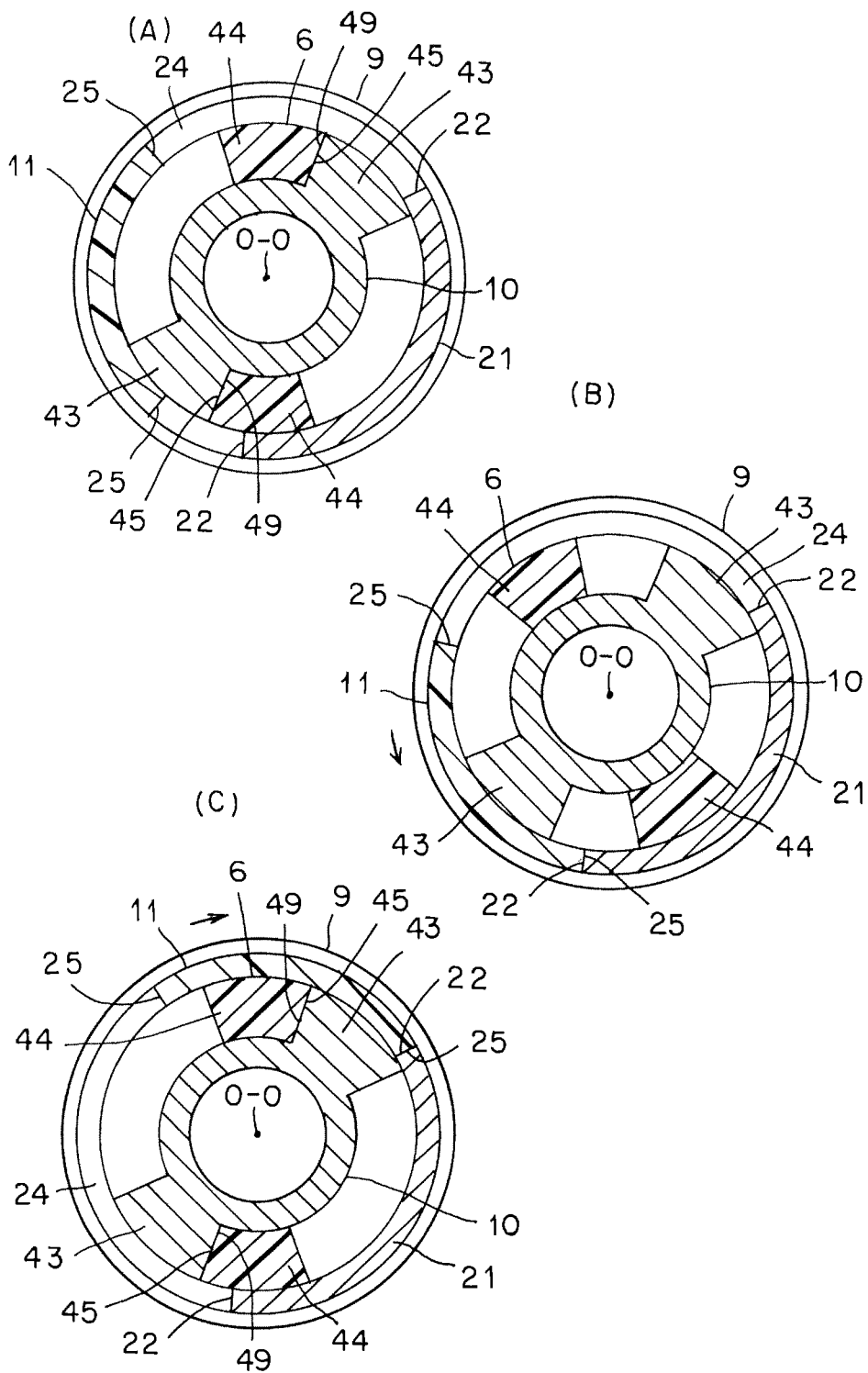
FIG. 11 is a transverse sectional view (a horizontal sectional view) showing a relative position relationship among the shaft, the shaft holder, the stopper member, and the gear case when a mirror assembly is positioned in a respective one of a use location, a storage location, and a forward tilt location.

As shown in FIG. 2, FIG. 8, and FIG. 11, on one face (a top face) of the shaft 11, two stopper protrusion portions 43 are integrally provided at equal intervals on a circumference around the rotation center O-O of the shaft 10. On the other hand, as shown in FIG. 2, FIG. 7, and FIG. 11, on one face (a bottom face) of the jaw portion 23 of the stopper member 6, two stopper protrusion portions 44 are integrally provided at equal intervals in such a manner as to correspond to the stopper protrusion portions 43 of the shaft 10 on the circumference around the rotation center O-O of the shaft 10.

As shown in FIG. 11 (A), if one face (an abutment face) 45 of the stopper protrusion portion 44 of the stopper member 6 abuts against one face (an abutment face) 49 of the stopper protrusion portion 43 of the shaft 10, as shown in FIG. 1 the mirror assembly 4 is positioned in a use location A with respect to the base 2. The abutment face 45 of the stopper protrusion portion 44 of the stopper member 6 and the abutment face 49 of the stopper protrusion portion 43 of the shaft 10 configure the mirror assembly use location determining mechanism.

(Description of Mirror Assembly Rotation Range Restraining Mechanism)

Figure 5:
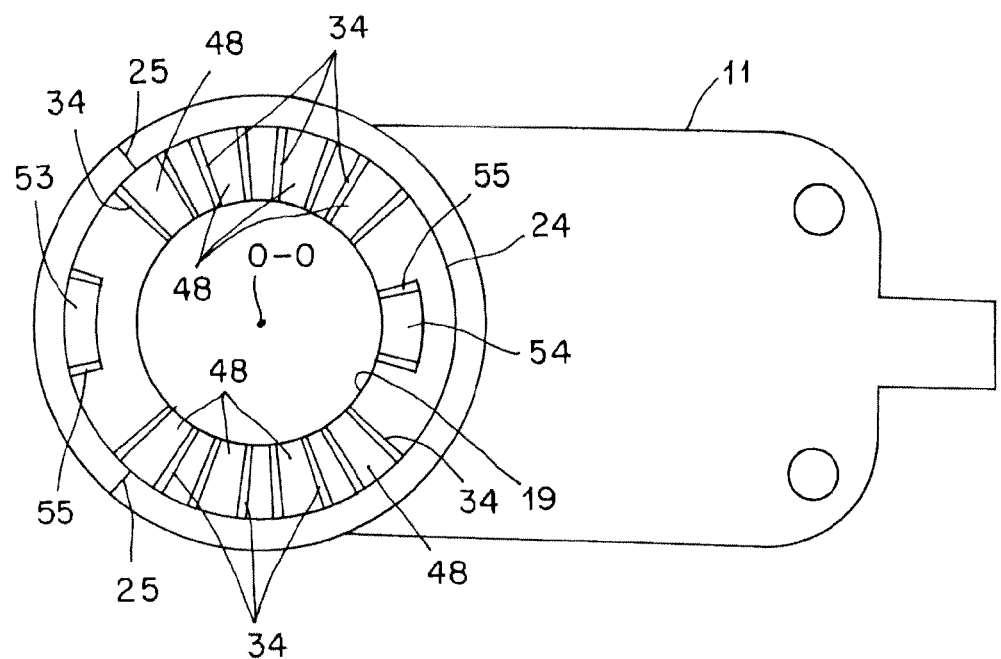
FIG. 5 is a view taken along the line V in FIG. 2, and is also a bottom view of a gear case.

As shown in FIG. 2 and FIG. 8, an arc-shaped arc protrusion portion 21 around the rotation center O-O of the shaft 10 is integrally provided on the top face of the shaft holder 9. An abutment face 22 is provided on a respective one of both end faces of the arc protrusion portion 21. On the other hand, as shown in FIG. 2 and FIG. 5, an arc-shaped arc groove 24 around the rotation center O-O of the shaft 10 is provided on a bottom face of the gear case 11. An abutment face 25 is provided on a respective one of both end faces of the arc groove 24.

The arc protrusion portion 21 of the shaft holder 9 is engaged with the arc groove 24 of the gear case 11. The arc protrusion portion 21 and the arc groove 24 configure a guiding member that serves as a guide when the gear case 11 rotates around the rotation center O-O of the shaft 10 with respect to the shaft holder 9, in other words, as shown in FIG. 1, when the mirror assembly 4 rotates backward (in the counterclockwise direction when seen in top view) or forward (in the clockwise when seen in top view) between the use location A and a storage location (a backward storage position) B and the use location A and a forward tilt location C with respect to the base 2. In FIG. 1, reference numeral E designates a backward direction of a vehicle, and reference numeral F designates a forward direction of the vehicle.

The abutment face 22 of the arc protrusion portion 21 and the abutment face 25 of the arc groove 24 configure the mirror assembly rotation range restraining mechanism. In other words, when the mirror assembly 4 is positioned in the storage location B, as shown in FIG. 11 (B), one of the abutment faces 22 of the arc protrusion portion 21 and one of the abutment faces 25 of the arc groove 24 abut against each other and then rotation of the mirror assembly 4 are restrained. When the mirror assembly 4 is positioned in the forward tilt location C, as shown in FIG. 11 (C), the other one of the abutment faces 22 of the arc protrusion portion 21 and the other one of the abutment faces 25 of the arc groove 24 abut against each other and then rotation of the mirror assembly 4 is restrained.

(Description of First Buffering Mechanism 59)

The stopper member 6 configures a first member of the first buffering mechanism 59. The gear case 11 configures a second member of the first buffering mechanism 59. A spring 36 of the clutch mechanism 15 configures a spring of the first buffering mechanism 59.

Figure 6:
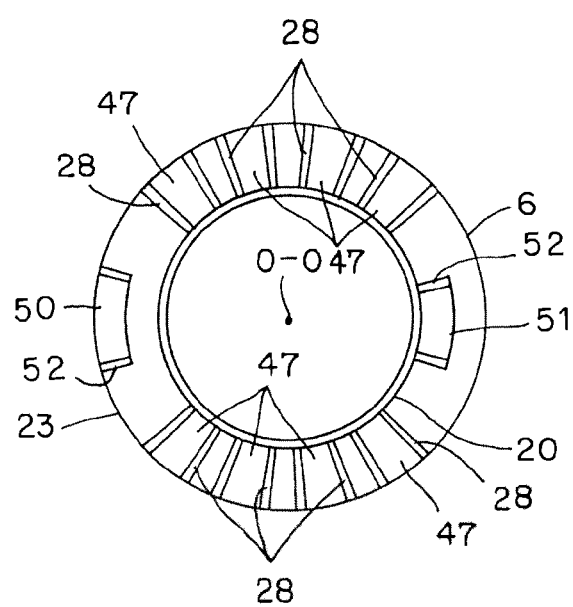
FIG. 6 is a view taken along the line VI in FIG. 2, and is also a plan view of a stopper member.

As shown in FIG. 6, on the other face (the top face) of the jaw portion 23 of the stopper member 6, two first notch portions (protrusion portions) 47 and two second notch portions (protrusion portions) 50 and 51 are integrally provided alternately and at substantially equal intervals on the circumference around the rotation center O-O of the shaft 10. The two first notch portions 47 and the second notch portions 50 and 51 are provided on a narrow circular ring shaped top face of the jaw portion 23 of the stopper member 6. A length in a circumferential direction of a respective one of the two first notch portions 47 is greater than a length in a circumferential direction of a respective one of the two second notch portions 50 and 51. A length in a radial direction of the shaft 10 of one of the two second notch portions 50 and 51 is different from a length in a radial direction of the other one of these notch portions. In other words, a length in the radial direction of the second notch portion 50 is greater than a length in the radiation direction of the other the second notch portion 51. As a result, one of the second notch portions 50 exists outside from the rotation center O-O of the shaft 10 more than the other one of the second notch portions 51.

Tilt faces (notch faces) 28 and 52 are respectively provided on both side faces of the two first notch portions 47 and on both side faces of the second notch portions 50 and 51. As far as the two first notch portions 47 are concerned, a plurality of in this example, four tilt faces 28 in the clockwise direction when seen in planar view and four tilt faces 28 in the counterclockwise direction when seen in planar view are provided for a respective one of the first notch portions 47. In other words, with respect to the two first notch portions 47, four small protrusion portions are provided for a respective one of the notch portions, and the tilt faces 28 are provided on a respective one of both side faces of the four small protrusion portions. In the stopper member 6, a total number of the tilt faces 28 and 52 in the clockwise direction when seen in planar view is 10, and a total number of the tilt faces 28 and 52 in the counterclockwise direction when seen in planar view is 10. Namely, a plurality of the first notch portions 47, a respective one of which is made of the four small protrusion portions, constitute one set of the first notch portions 47.

As shown in FIG. 5, on a face (a bottom face) that is between the insert hole 19 and the arc groove 24 of the gear case 11 and that is opposed to the top face of the jaw portion 23, similarly, two (two sets of) first notch portions (recessed portions) 48 and two second notch portions (recessed portions) 53 and 54 are integrally provided alternately and at substantially equal intervals around the rotation center O-O of the shaft 10. The two first notch portions 48 and the two second notch portions 53 and 54 are provided on a narrow circular ring shaped bottom face between the insert hole 19 and the arc groove 24 of the gear case 11. A length in a circumferential direction of a respective one of the two first notch portions 48 is greater than a length in a radial direction of the shaft 10 of a respective one of the two second notch portions 53 and 54. A length in a radial direction of the shaft of a respective one of the two second notch portions 53 and 54 is different from a length in a radial direction of the other one. In other words, a length in the radial direction of the second notch portion 53 is greater than a length in the radial direction of the other the second notch portion 54. As a result, the second notch portion 53 exists outside from the rotation center O-O of the shaft 10 more than the other the second notch portion 54.

On both side faces of the two first notch portions 48 and on both sides of the second notch portions 53 and 54, tilt faces (notch faces) 34 and 55 are respectively provided in correspondence with the tilt faces 28 and 52 of the stopper member 6. As far as to the two first notch portions are concerned, a plurality of, in this example, four tilt faces 34 in the clockwise direction when seen in bottom view and four tilt faces 34 in the counterclockwise direction when seen in bottom view are provided for a respective one of the first notch portions 48. In other words, as far as the two first notch portions 48 are concerned, four small recessed portions are provided for a respective one of the notch portions, and the tilt faces 34 are provided on a respective one of both side faces of the four recessed portions. In the gear case 11, a total number of tilt faces 34 and 55 in the clockwise direction when seen in bottom view is 10, and a total number of the tilt faces 34 and 55 in the counterclockwise direction when seen in bottom view is 10. Namely, a plurality of the first notch portions 48, a respective one of which is made of the four small recessed portions, constitute one set of the first notch portions 48.

Figure 12:
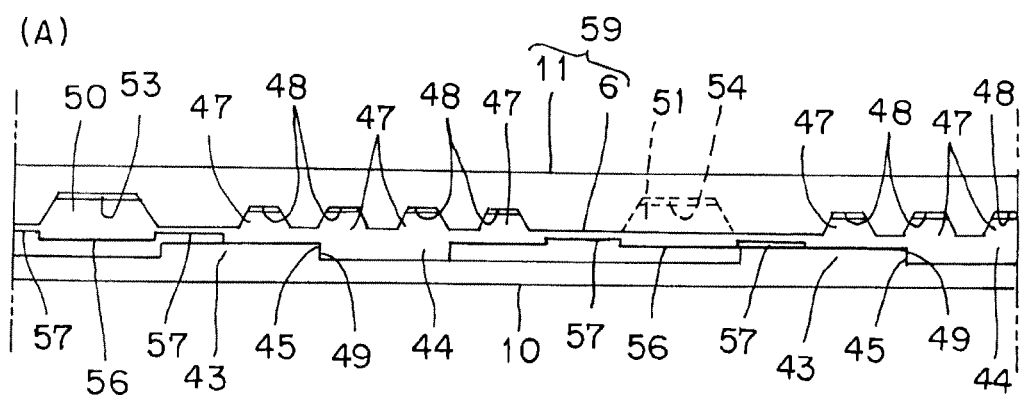
FIG. 12 is an explanatory view showing a function of a first buffering mechanism when the mirror assembly is electrically driven to thereby rotate from the use location to the storage location.
Figure 12:
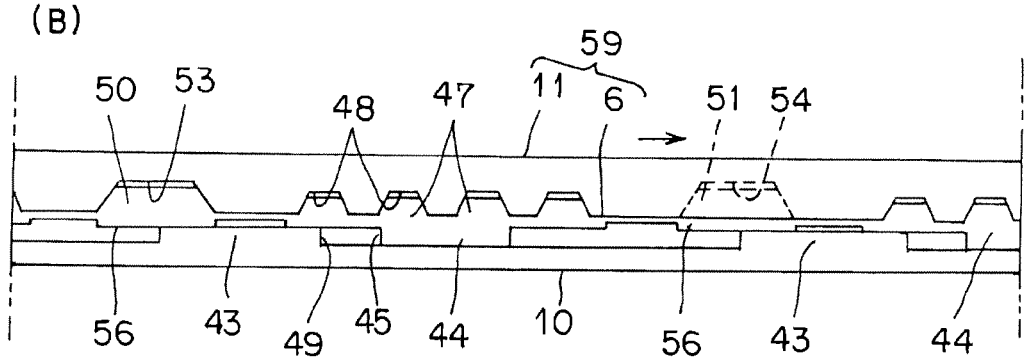
Figure 13:
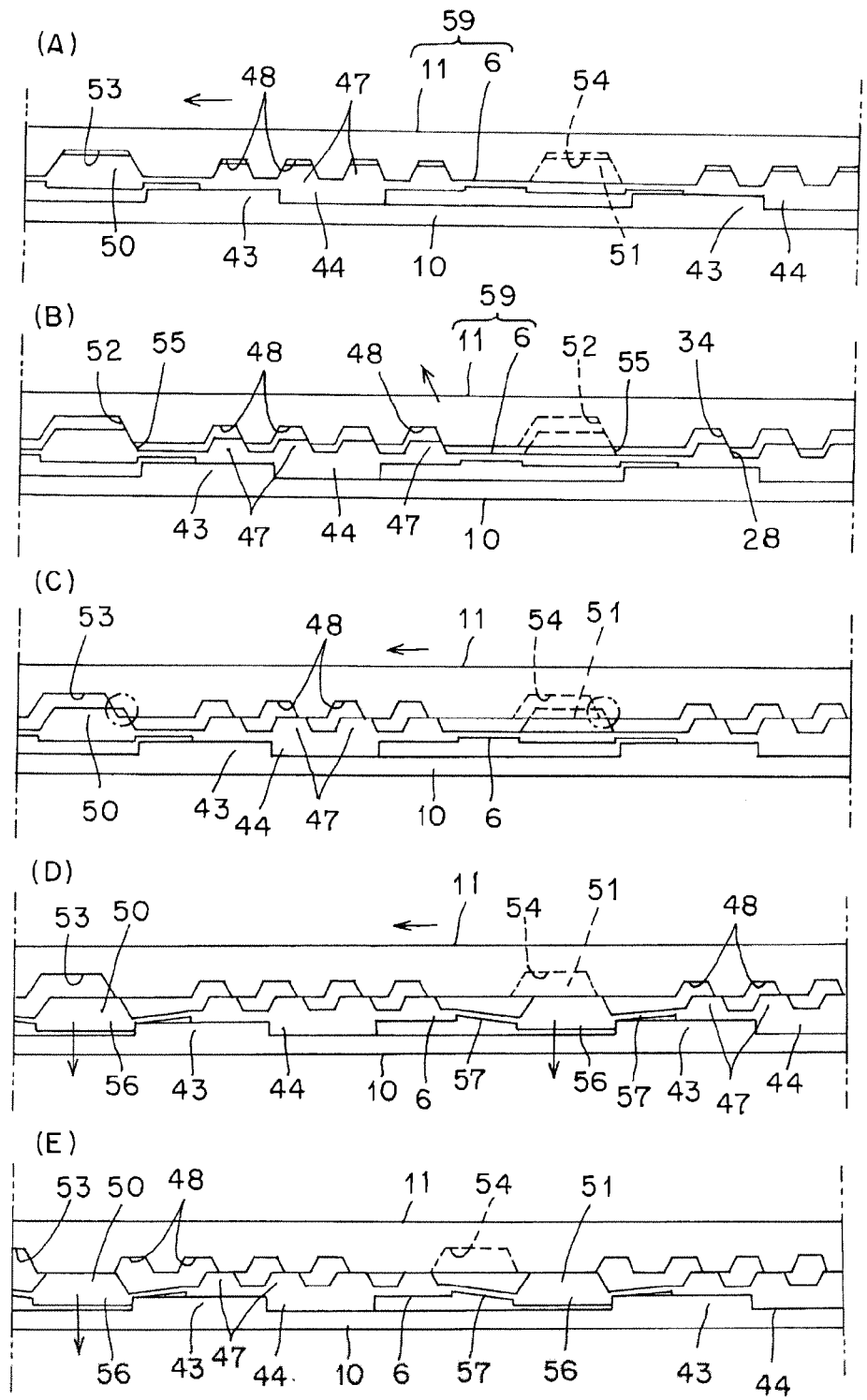
FIG. 13 is an explanatory view showing a function of the first buffering mechanism when the mirror assembly tilts (rotates) from the use location to the forward tilt location for the sake of buffering.

The stopper member 6, the gear case 11, and the spring 36 of the clutch mechanism 15 configure the first buffering mechanism 59. In other words, when the mirror assembly 4 is positioned between the use location A and the storage location B, as shown in FIG. 12, FIG. 13 (A), and FIG. 14 (B), the tilt faces 28 and 52 of the stopper member 6 and the tilt faces 34 and 55 of the gear case 11 are caused to abut against each other by means of a spring force of the spring 36 of the clutch mechanism 15. When the mirror assembly 4 rotates forwardly from the use location A with respect to the shaft 10 for the sake of buffering, as shown in FIG. 13 (B), the tilt faces 34 and 55 of the gear case 11 on the side of the mirror assembly 4 nm aground along the tilt faces 28 and 52 of the stopper member 6 on the side of the shaft 10. If the tilt faces 34 and 55 of the gear case 11 run aground along the tilt faces 28 and 52 of the stopper member 6, as shown in FIG. 13 (C), FIG. 13 (D), and FIG. 13 (E), the gear case 11 on the side of the mirror assembly 4 rotates forward from the use location A with respect to the stopper member 6 on the side of the shaft 10.

In the stopper member 6, a height of a respective one of the second notch portions 50 and 51 is greater than a height of a respective one of the first notch portions 47. As a result, as shown in FIG. 13 (C), at a stage at which the first notch portions 48 of the gear case 11 disengage from the first notch portions 47 of the stopper member 6, corner portions of the second notch portions 53 and 54 of the gear case 11 and corner portions of the second notch portions 50 and 51 of the stopper member 6 overlap each other (refer to the inside of the small circle indicated by the double dotted chain line in FIG. 13 (C)).

A tilt angle (a running aground angle) of a respective one of the ten tilt faces 28 and 52 of the stopper member 6 is basically equal to a tilt angle (a running aground angle) of a respective one of the tilt faces 34 and 55 of the gear case. The word "basically equal" denotes being equal from the viewpoint of design, and includes an error in an actual range of product precision as well. In addition, either of the tilt angles may be increased in accordance with a combination of materials employed for the stopper member 6 and the gear case 11. For example, with respect to the tilt angle of a respective one of the tilt faces 34 and 55 of the stopper member 6, 0 degree to 3 degrees may be added to the tilt angle of a respective one of the tilt faces 28 and 52 of the stopper member 6. Alternatively, with respect to the tilt angle of a respective one of the tilt faces 34 and 55 of the stopper member 6, 0 degree to 3 degrees may be subtracted from the tilt angle of a respective one of the tilt faces 28 and 52 of the stopper member 6.

(Description of Rotation Force Transmission Mechanism)

The deceleration mechanism 14 and the clutch mechanism 15 of the rotation force transmission mechanism are provided between an output shaft (not shown) of the motor 13 and the shaft 10, and are adapted to transmit a rotation force of the motor 13 to the shaft 10. The motor 13 and the deceleration mechanism 14 and the clutch mechanism 15 of the rotation force transmission mechanism are electrically driven to thereby rotate the mirror assembly 4 around the rotation center O-O of the shaft 10 with respect to the shaft 10.

(Description of Deceleration Mechanism 14)

The deceleration mechanism 14 is made of: a first worm gear 29 that serves as a first shift gear; a helical gear 30 that serves as a second shift gear meshed with the first worm gear 29; a second worm gear 31 that serves as a third shift gear; and a clutch gear 32 that serves as a final shift gear with which the second worm gear 31 is meshed.

The first worm gear 29 is rotatably borne on the gear case 11 and the bearing member 16. The first worm gear 29 is coupled with the output shaft of the motor 13 via a joint 17. The helical gear 30 is rotatably borne on the bearing member 16. The second worm gear 31 is rotatably borne on the gear case 11 and the bearing member 16. The helical gear 30 and the second worm gear 31 are integrally and rotatable coupled with each other.

(Description of Clutch Mechanism 15)

The clutch mechanism 15 is provided with the clutch gear 32, a clutch 33, a clutch holder 35, the spring 36, and a push nut 37. The clutch gear 32 and the clutch 33 are respectively independent of each other; are integrally combined with each other; and are integrally actuated together. It is to be noted that the clutch gear 32 and the clutch 33 may be integrally configured with each other. The clutch mechanism 15 is configured by sequentially engaging the clutch gear 32, the clutch 33, the clutch holder 35, and the spring 36 with the shaft 10, securing the push nut 37 to the shaft 10, and establishing the spring 36 in a compressed state. The clutch 33 and the clutch holder 35 are removably coupled with each other. The second worm gear 31 of the deceleration mechanism 14 and the clutch gear 32 of the clutch mechanism 15 are meshed with each other, whereby the rotation force of the motor 13 is transmitted to the shaft 10.

Figure 3:
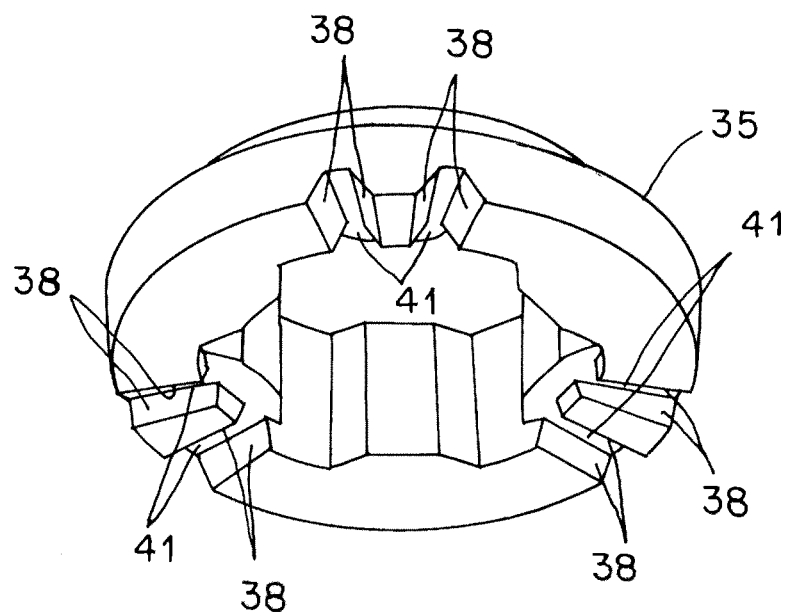
FIG. 3 is a view taken along the line III in FIG. 2, and is also a perspective view seen in bottom view of a clutch holder.
Figure 4:
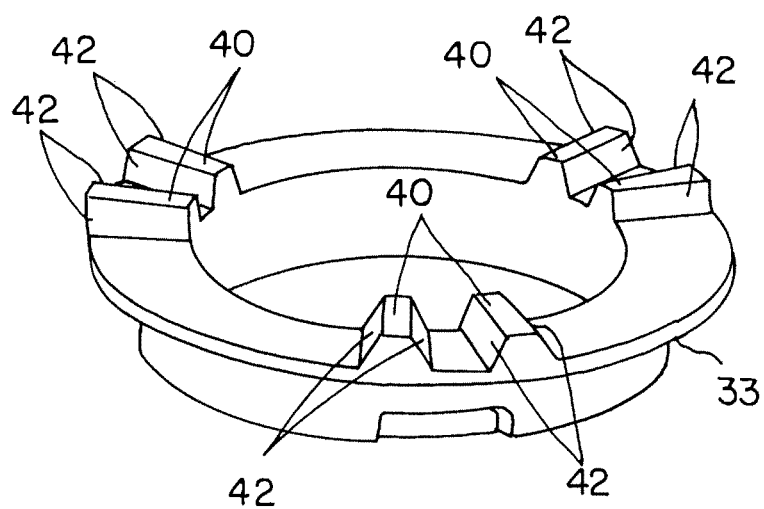
FIG. 4 is a view taken along the line IV in FIG. 2, and is also a perspective view seen in top view of a clutch.

The clutch 33 is mounted to the shaft 10 in such a manner as to be rotatable around the rotation center O-O of the shaft 10 and to be movable in an axial direction. The clutch holder 35 is mounted to the shaft 10 in such an engaged state as to disable rotation and to be movable in the axial direction. As shown in FIG. 2 to FIG. 4, on faces that are respectively opposite to of the clutch 33 and the clutch holder 35, in other words, on one face (a top face) of the clutch 33 and one face (a bottom face) of the clutch holder 35, a clutch protrusion portion 40 that is formed in a reverse V shape and a clutch recessed portion 41 that is formed in a V shape are respectively provided.

When the clutch protrusion portion 40 and the clutch recessed portion 41 are established in an engaged state, the clutch 33 and the clutch holder 35 are established in a continuous state (in a non-disengaged state or in a connected state), or alternatively, when the clutch protrusion portion 40 and the clutch recessed portion 41 are established in a disengaged state, the clutch 33 and the clutch holder 35 are established in a discontinuous state (in a disengaged state or in a disconnected state). The clutch mechanism 15 is not disengaged by means of an electrically driven rotation force of the motor 13 and the rotation force transmission mechanism (the deceleration mechanism 14 and the clutch mechanism 15), and is disengaged by means of the electrically driven rotation force or more, causing the mirror assembly 4 to be rotatable with respect to the shaft 10.

In the clutch member, the other face (a bottom face) of the clutch gear 32 abuts against one face (a top face) of a bottom part of the gear case 11 directly or via a washer 46. On the other hand, in the clutch member, the other face (a top face) of the clutch holder 35 directly abuts against the spring 36.

(Description of Second Buffering Mechanism)

The clutch holder 35 configures a first member of the second buffering mechanism. The clutch 33 configures a second member of the second buffering mechanism. The spring 36 of the clutch mechanism 15 configures a spring of the second buffering mechanism. The spring 36 of the clutch mechanism 15 is compatible with a spring of the first buffering mechanism 59 and a spring of the second buffering mechanism.

As shown in FIG. 3, on a bottom face of the clutch holder 35, three (three sets of) notch portions, in other words, the clutch recessed portions 41 are provided at equal intervals on the circumference around the rotation center O-O of the shaft 10. The three clutch recessed portions 41 are provided on a narrow circular ring shaped bottom face of the clutch holder 35. Tilt faces (notch faces) 38 are respectively provided on both side faces of the three clutch recessed portions 41. As far as the three clutch recessed portions 41 is concerned, a plurality of, in this example, two tilt faces 38 in the clockwise direction when seen in bottom view and two tilt faces 38 in the clockwise direction when seen in bottom view are provided for a respective one of the clutch recessed portions 41. In other words, two small recessed portions are provided on a respective one of the three clutch recessed portions 41, and the tilt faces 38 are respectively provided on both side faces of the two clutch recessed portions 41. In the clutch holder 35, a total number of the tilt faces 38 in the clockwise direction when seen in bottom view is 6, and a total number of the tilt faces 38 in the counterclockwise direction when seen in bottom view is 6. Namely, a plurality of the clutch recessed portions 41, a respective one of which is made of the two small recessed portions, constitute one set of the clutch recessed portions 41.

As shown in FIG. 4, on a top face of the clutch 33, three (three sets of) notch portions, in other words, the clutch protrusion portions 40 are provided at equal intervals on the circumference around the rotation center O-O of the shaft 10. The three clutch protrusion portions 40 are provided on a narrow circular ring shaped top face of the clutch 33. On both side faces of the three clutch protrusion portions 40, tilt faces (notch faces) 42 are respectively provided in correspondence with the tilt faces 38 of the clutch holder 35. As far as the three clutch protrusion portions 40 is concerned, a plurality of, in this example, two tilt faces 42 in the clockwise direction when seen in planar view and two tilt faces 42 in the counterclockwise direction when seen in planar view are provided for a respective one of the clutch protrusion portions 40. In other words, two small protrusion portions are provided for a respective one of the three clutch protrusive portions 40, and the tilt faces 42 are respectively provided on both side faces of the two small protrusive portions. In the clutch 33, a total number of the tilt faces 42 in the clockwise direction when seen in planar view is 6, and a total number of the tilt faces 42 in the counterclockwise direction when seen in planar view is 6. Namely, a plurality of the clutch protrusion portions 40, a respective one of which is made of the two small protrusion portions, constitute one set of the clutch protrusion portions 40.

Figure 15:
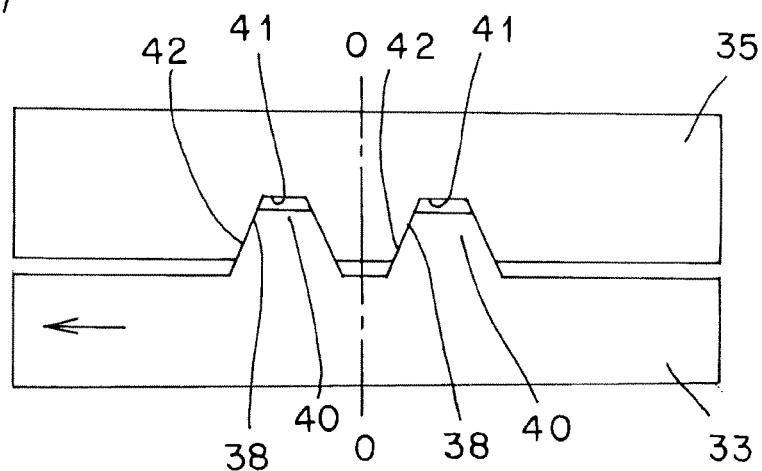
FIG. 15 is an explanatory view showing a function of a second buffering mechanism (a clutch mechanism)
Figure 15:
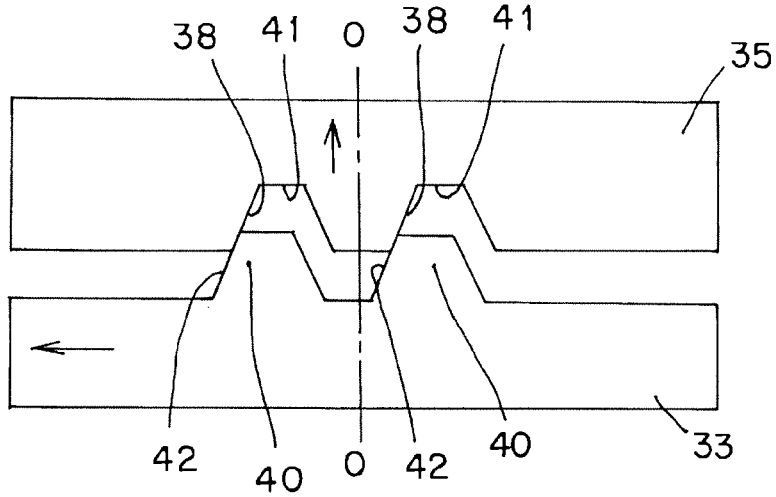
Figure 16:
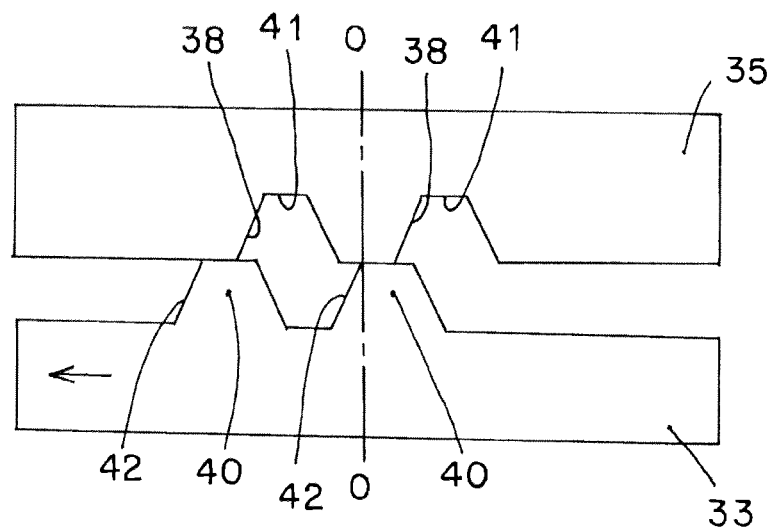
FIG. 16 is an explanatory view showing a function of the second buffering mechanism (the clutch mechanism)
Figure 16:
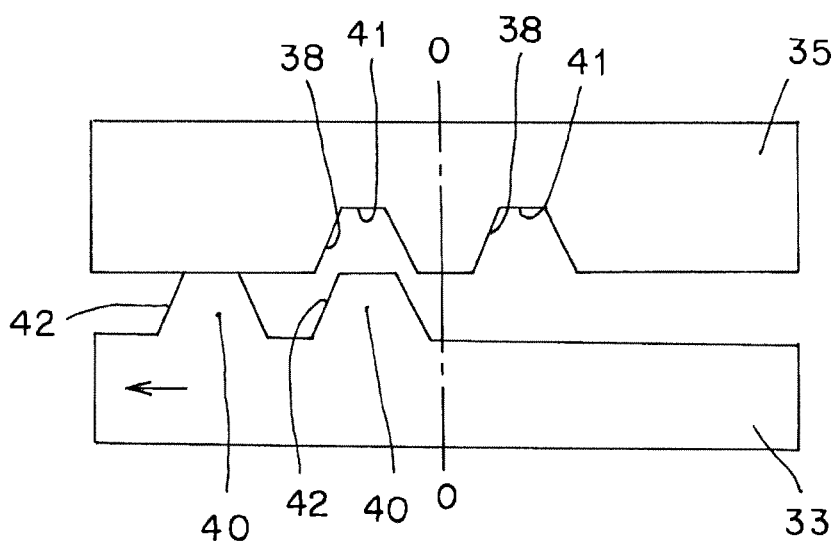

The clutch holder 35, the clutch 33, and the spring 36 configures the clutch mechanism 15, and also configures the second buffering mechanism. In other words, as shown in FIG. 15 (A), the tilt faces 38 of the clutch recessed portion 41 of the clutch holder 35 and the tilt faces 42 of the clutch protrusion portion 40 of the clutch 33 are caused to abut against each other by means of the spring force of the spring 36. When the mirror assembly 4 rotates with a force that is equal to or greater than an electrically driven force of the electrically driven storage unit 3, as shown in FIG. 15 (B), against the spring force of the spring 36, the tilt faces 42 of the clutch 33 on the side of the mirror assembly 4 push up the clutch holder 35 on the side of the shaft 10 along the tilt faces 38 of the clutch holder 35. When the tilt faces 42 of the clutch 33 push up the clutch holder 35 along the tilt faces 38 of the clutch holder 35, as shown in FIG. 16 (A) and FIG. 16 (B), the clutch 33 on the side of the mirror assembly 4 rotates forward from the use location A with respect to the clutch holder 35 on the side of the shaft 10.

A tilt angle (a running aground angle) of a respective one of the six tilt faces 38 of the clutch holder 35 is basically equal to a tilt angle (a running aground angle) of a respective one of the six tilt faces 42 of the clutch 33. The word "basically equal" denotes being equal from the viewpoint of design, and includes an error in an actual range of product precision as well. In addition, either one of the tilt angles may be increased in accordance with a combination of materials employed for the clutch holder 35 and the clutch 33. For example, as far as the tilt angle of a respective one of the tilt faces 38 of the clutch holder 35 is concerned, 0 degree to 3 degrees may be added to the tilt angle of a respective one of the tilt faces 42 of the clutch 33. Alternatively, as far as the tilt angle of a respective one of the tilt faces 38 of the clutch holder 35 is concerned, 0 degree to 3 degrees may be subtracted from the tilt angle of a respective one of the tilt faces 42 of the clutch 33.

(Description of Stopper Member Lock Mechanism)

Figure 14:
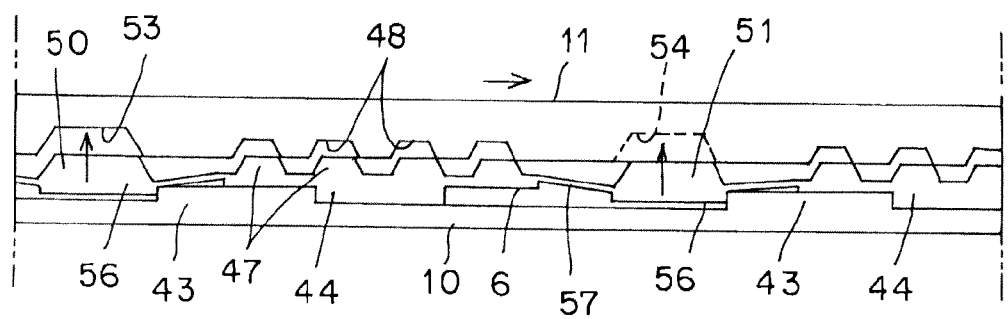
FIG. 14 is an explanatory view showing a function of the first buffering mechanism when the mirror assembly returns back (rotates) from the forward tilt location to the use location for the sake of buffering.
Figure 14:
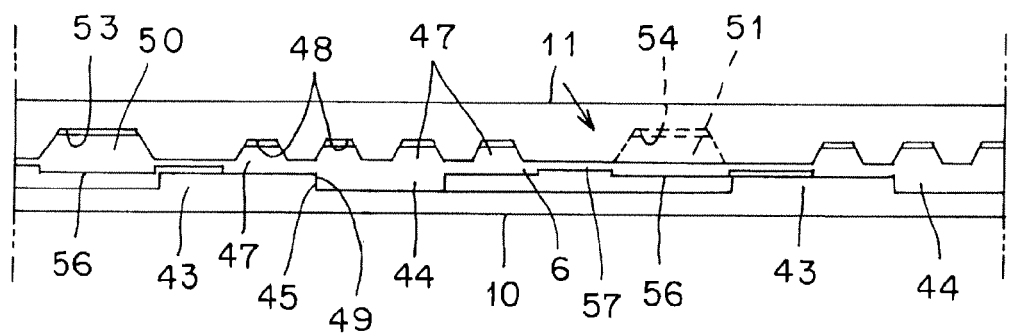

As shown in FIG. 7, FIG. 13, and FIG. 14, on a bottom face of the jaw portion 23 of the stopper member 6, two lock protrusion portions 56 are integrally provided at equal intervals on the circumference around the rotation center O-O of the shaft 10 and between the two stopper protrusion portions 44. The lock protrusion portions 56 and the second notches 50 and 51 are positioned on the top and bottom via the jaw portion 23.

As far as the jaw portion 23 of the stopper member 23 is concerned, a thin portion 57 is provided on a respective one of both sides of the lock protrusion portion 56. In other words, in the bottom face of the jaw portion 23 of the stopper member 6, a shallow recessed portion is provided on a respective one of both sides of the lock protrusion portion 56. On the other hand, in connection portions with the jaw portion 23 of the cylinder portion 20 of the stopper member 6, a cutout 58 is provided in a portion that corresponds to a respective one of the second notch portions 50 and 51. As a result, by means of flexibility of the thin portion 57 and the cutout 58, the lock protrusion portion 56 is deformable and movable in an axial direction (in a vertical direction) of the shaft 10 with respect to the stopper protrusion portion 44.

The lock protrusion portion 56 of the stopper member 6 and the stopper protrusion portion 43 of the shaft 10 configure the stopper member lock mechanism. In other words, when the mirror assembly 4 rotates forward (in the clockwise direction shown in FIG. 1) from the use location A, as shown in FIG. 13 (D) and FIG. 13 (E), a bottom face of the gear case 11 pushes down the lock protrusion portion 56 of the stopper member 6 in the direction as indicated by the solid arrow. At this time, the thin portion 57 of the stopper member 6 is elastically deformed and then the lock protrusion portion 56 of the stopper member 6 is pushed down in the direction as indicated by the solid arrow. In this manner, one face of the lock protrusion portion 56 of the stopper member 6 abuts against the other face of the stopper protrusion portion 43 of the shaft 10 (an opposite face to the abutment face 49). As a result, when the mirror assembly 4 that is positioned in the forward tilt location C is returned back to the use location A, it becomes possible to lock the mirror assembly 4 rotation of the stopper member 6 that serves as the first member of the first buffering mechanism 59 from rotating in the counterclockwise direction shown in FIG. 1 with respect to the shaft 10 (in the direction from the forward tilt location A to the backward storage location B).

In the embodiment, when the mirror assembly 4 rotates forward (in the clockwise direction shown in FIG. 1) from the use location A, as shown in FIG. 13 (D), FIG. 13 (E), and FIG. 14 (A), the abutment face 45 of the stopper protrusion portion 44 of the stopper member 6 abuts against the abutment face 49 of the stopper protrusion portion 43 of the shaft 10. Therefore, if one face of the lock protrusion portion 56 of the stopper member 6 abuts against the other face 43 of the shaft 10, the stopper protrusion portion 44 and the lock protrusion portion 43 of the stopper member 6 are caused to sandwich the stopper protrusion portion 43 of the shaft 10 therebetween from both sides. As a result, the stopper member 6 is established in such a state as to be locked to the shaft 10, in other words, in such a state as to disable rotation with respect to the shaft 10.

When the mirror assembly 4 is positioned immediately before use location A from the forward tilt location C, as shown in FIG. 14 (A), the second notch portions 53 and 54 of the gear case 11 are positioned in the second notch portions 50 and 51 of the stop member 6. After that, the thin portion 57 of the stop member 6, which has been elastically deformed up to now, is elastically restored, the second notch portions 50 and 51 of the stop member 6, which have been pushed downward by means of the bottom face of the gear case 1 up to now, are pushed upward in the direction as indicated by the solid arrow. In this manner, it becomes possible to release a state of the abutment between one face of the lock protrusion portion 56 of the stopper member 6 and the other face of the stopper protrusion portion 43 of the shaft 10. As a result, the stopper member 6 is capable of rotating backward from the use location A with respect to the shaft 10.

[Description of Function of First Embodiment]

The electrically driven storage door mirror device 1 in the first embodiment is made of the constituent elements as described above, and hereinafter, its related functions will be descried.

(Description of Use Location A)

First, a description will be given with respect to a case in which the mirror assembly 4 that is positioned in the use location A is electrically driven to be thereby rotated and restored to the storage location B, as shown in FIG. 1. When the mirror assembly 4 is positioned in the use location A (in a set state or in a use state), a mirror assembly use location determining mechanism is established in a respective one of the states shown in FIG. 11 (A), FIG. 12 (A), FIG. 13 (A), and FIG. 14 (B); the mirror assembly rotation range restraining mechanism is established in the state shown in FIG. 11 (A); the first buffering mechanism 59 is established in the states shown in FIG. 12 (A), FIG. 13 (A), and FIG. 14 (B); the clutch mechanism 15 that serves as the second buffering mechanism is established in the state shown in FIG. 15 (A); and the stopper member lock mechanism is established in a respective one of the states shown in FIG. 12 (A), FIG. 13 (A), and FIG. 14 (B).

In other words, the mirror assembly use location determining mechanism, as shown in FIG. 11 (A), FIG. 12 (A), FIG. 13 (A), and FIG. 14 (B), is established in a state in which a abutment face 45 of the stopper protrusion portion 44 of the stopper member 6 abuts against the abutment face 49 of a stopper protrusion portion 43 of the shaft 10. As a result, the stopper member 6 is disabled from rotation in the clockwise direction shown in FIG. 11 (A) with respect to the shaft 10. In other words, the mirror assembly 4 is disabled from rotation in a forward direction from the use location A. In this manner, the mirror assembly 4 is reliably positioned in the use location A without any vibration.

The mirror assembly rotation range restraining mechanism, as shown in FIG. 11 (A), is established in a state in which two abutment faces 22 of the arc protrusion portion 21 of the shaft holder 9 and two abutment faces 25 of the arc groove 24 of the gear case 11 do not abut against each other. As a result, the gear case 11 is rotatable with respect to the shaft holder 9.

The first buffering mechanism 59, as shown in FIG. 12 (A), FIG. 13 (A), and FIG. 14 (B), is established in a state in which the tilt faces 28 of the first notch portion 47 and the tilt faces 52 of the second notch portion 50 of the stopper member 6 and the tilt faces 34 of the first notch portion 48 and the tilt faces 55 of the second notch portion 53 of the gear case 11 are caused to abut against each other by means of the spring force of the spring 36 of the clutch mechanism 15. As a result, the gear case 11 and the stopper member 6 are established in a state in which these constituent elements are integrated with each other; and therefore, the gear case 11 is disabled from rotation in the clockwise direction shown in FIG. 11 (A) with respect to the shaft 10 via the stopper member 6. In other words, the mirror assembly 4 is disabled from rotation in the forward direction from the use location A. In this manner, the mirror assembly 4 is reliably positioned in the use location A without any vibration.

The clutch mechanism 15 that serves as the second buffering mechanism, as shown in FIG. 15 (A), is established in a state in which tilt faces 42 of a clutch protrusion portion 40 of a clutch 33 and tilt faces 38 of a clutch recessed portion 41 of a clutch holder 35 are caused to engage with each other; and therefore, the clutch gear 32 and the clutch holder 35 are established in a continuous state. Hence, the clutch gear 32 and the clutch 33 are established in such a state as to disable rotation with respect to the shaft 10 together with the clutch holder 35. In this manner, the mirror assembly 4 is reliably positioned in the use location A without any vibration.

The stopper member lock mechanism, as shown in FIG. 12 (A), FIG. 13 (A), and FIG. 14 (B), is established in a state in which one face of the lock protrusion portion 56 of the stopper member 6 and the other face of the stopper protrusion portion 43 of the shaft 10 do not abut against each other. As a result, the stopper member 6 is rotatable in the counterclockwise direction shown in FIG. 11 (A) with respect to the shaft 10.

(Description of Electrically Driven Rotation from Use Location A to Storage Location B)

In the abovementioned set state (in the use state), a switch (not shown) in a room of a vehicle is operated, whereby power is fed to the motor 13 via the connector 8, the socket portion 7, and the board 27 and then the motor 13 is driven. After that, a rotation force of the motor 13 is transmitted to the clutch gear 32 that is fixed to the shaft 10 via the output shaft and the deceleration mechanism 14. At this time, the clutch gear 32 is established in such a state as to disable rotation with respect to the shaft 10 together with the clutch 33 and the clutch holder 35; and therefore, the second worm gear 31 of the deceleration mechanism 14 rotates around the rotation center O-O of the shaft 10 while the clutch gear 32 is employed as a fixed gear. By means of this rotation, the mirror assembly 4 having incorporated the electrically driven storage unit 3 therein, as shown in FIG. 1, rotates in the clockwise direction when seen in top view, from the use location A to the storage location B around the rotation center O-O of the shaft 10.

When this mirror assembly 4 rotates in the counterclockwise direction when seen in top view, from the use location A to the storage location B, the gear case 11 and the stopper member 6 of the electrically driven storage unit 3 rotate similarly in the counterclockwise direction when seen in top view with respect to the shaft 10 (in the direction as indicated by the solid arrow shown in FIG. 11 (B) and FIG. 12 (B). Concurrently, the abutment face 45 of the stopper protrusion portion 44 of the stopper member 6 deviates from the abutment face 49 of the stopper protrusion portion 43 of the shaft 10.

When the mirror assembly 4 is positioned in the storage location B, as shown in FIG. 11 (B), one abutment face 25 of the arc groove 24 of the gear case 11 abuts against one abutment face 22 of the arc protrusion portion 21 of shaft holder 9 and then rotation of the gear case 11 stops. At the same time, a value of a current (an actuation current) that is supplied to the motor 13 rises and reaches a predetermined value, a switch circuit of the board 27 is actuated and then current supply to the motor 13 is shut down. As a result, the mirror assembly 4 stops and is positioned in the storage location B that is a predetermined location shown in FIG. 1.

(Description of Electrically Driven Rotation Restoration from Storage Location B to Use Location A)

Next, a description will be given with respect to a case in which the mirror assembly 4 that is positioned in the storage location B is electrically driven to be thereby rotated and restored to the storage location A, as shown in FIG. 1. In a state in which the mirror assembly 4 is positioned in the storage location B (in the storage state), a switch (not shown) in a room of a vehicle is operated and then the motor 13 is driven.

After that, the rotation force of the motor 13 is transmitted via the deceleration mechanism 14 to the clutch gear 32 that is established in a rotation disabled state. In this manner, the mirror assembly 4 having incorporated the electrically driven storage unit 3 therein, as shown in FIG. 1, rotates in the clockwise direction when seen in top view, from the storage location B to the use location A around the rotation center O-O of the shaft 10.

When this mirror assembly 4 rotates in the counterclockwise direction when seen in top view, from the storage location B to the use location A, the gear case 11 and the stopper member 6 of the electrically driven storage unit 3 rotate similarly in the counterclockwise direction when seen in top view with respect to the shaft 10 (in the direction as indicated by the solid arrow shown in FIG. 11 (B) and FIG. 12 (B). Accordance with this, the abutment face 25 of one of the arc groove 24 of the gear case 11 away from the abutment face 22 one of the arc protrusion portion 21 of the shaft holder 9.

When the mirror assembly 4 is positioned in the use location A, as shown in FIG. 11 (A), the abutment face 45 of the stopper protrusion portion 44 of the stopper member 5 abuts against the abutment face 49 of the stopper protrusion portion 43 of the shaft 10. As a result, the rotation between the gear case 11 and the stopper member 6 stops. At the same time, a value of a current (an actuation current) that is supplied to the motor 13 rises and reaches a predetermined value, a switch circuit of the board 27 is actuated and then current supply to the motor 13 is shut down. As a result, the mirror assembly 4 stops and is positioned in the use location A that is a predetermined location shown in FIG. 1.

(Description of Tilt from Use Location A to Forward Tilt Location C for Buffering)

Further, a description will be given with respect to a case in which the mirror assembly 4 that is positioned in the use location A is tilted in the forward tilt location C for the sake of buffering, as shown in FIG. 1. In a state in which the mirror assembly 4 is set to be ready (in a use state), a force in the clockwise direction from the top, the force being greater than an electrically driven rotation force by means of the motor 13 and the deceleration mechanism 14 (in other words, a manually driven force or a force that is generated when something hits the mirror assembly 4), is applied to the mirror assembly 4 that is positioned in the use location A. After that, the gear case 11 that is mounted to the mirror assembly 4 is about to rotate in the clockwise direction from the top (in the direction as indicated by the solid arrow shown in FIG. 11 (C) and FIG. 13 (C)).

After that, as indicated by the solid arrow shown in FIG. 13 (B), against the spring force of the spring 36, the tilt faces 34 of the first notch portion 48 and the tilt faces 55 of the second notch portions 53 and 54 of the gear case 11 run aground along the tilt faces 28 of the first notch portion 47 and the tilt faces 52 of the second notch portions 50 and 51 of the stopper member 6. In other words, the gear case 11 moves (rotationally rises) with respect to the stopper member 6 and the shaft 10. Next, the gear case 11 further is about to rotate in the clockwise from the top. After that, as shown in FIG. 9, a backlash between the clutch gear 32 and the second worm gear 31 is clogged, a gap in a thrust direction of the second worm gear 31 is clogged and then an engagement gap between the shaft 10 and the clutch holder 35 is clogged.

The clutch holder 35 is engaged with the shaft 10 in such a manner as to disable rotation; and therefore, as indicated by the solid arrow shown in FIG. 15 (A), the clutch 33 on the side of the gear case 11 is about to rotate with respect to the clutch holder 35 on a fixed side of the shaft 10. After that, as indicated by the solid arrow shown in FIG. 15 (B), the tilt faces 42 of the clutch protrusion portion 40 of the clutch 33 on the side of the gear case 11 pushed upward the clutch holder 35 on the fixed side of the shaft 10. Further, as indicated by the solid arrow shown in FIG. 16 (A), the tilt faces 42 of the clutch protrusion portion 40 of the clutch 33 and the tilt faces 38 of the clutch recessed portion 41 of the clutch holder 35 disengage from each other. At this time, the clutch holder 35 moves (rotationally rises) with respect to the shaft 10 against the spring force of the spring 36 and then the clutch 33 rotates in the clockwise direction as indicated by the solid arrow shown in FIG. 16 (B).

As a result, the gear case 11 (including the cover 12, the motor 13, the deceleration mechanism 14, the bearing member 16, the clutch gear 32, and the clutch 33) rotates in the clockwise direction when seen in top view. At this time, as shown in FIG. 13 (C), in the stopper member 6, a height of a respective one of the second notch portions 50 and 51 is greater than a height of the first notch portion 47. As a result, the tilt faces 34 of the first notch portion 48 of the gear case 11 runs aground the tilt faces 28 of the first notch portion 47 of the stopper member 6, whereas the tilt faces 55 of the second notch portions 53 and 54 of the gear case 11 does not run aground the tilt faces 52 of the second notches 50 and 51 of the stopper member 6. Therefore, as shown in the small circle indicated by the double dotted chain line in FIG. 13 (C), the corner portions of the second notch portions 53 and 54 of the gear case 11 and the corner portions of the second notch portions 50 and 51 of the stopper member 6 overlap each other.

In the light of the foregoing description, the gear case 11 rotates in the clockwise direction (in the direction as indicated by the solid arrow shown in FIG. 13 (D)) and then as shown in FIG. 13 (D), the bottom face of the gear case 11 (the bottom face between the first notch portion 48 and a respective one of the second notch portions 53 and 54) runs aground the top face of the stopper member 6 (the top face between the first notch portion 47 and a respective one of the second notch portions 50 and 51). After that, the thin portion 57 of the stopper member 6 is elastically deformed and then the second notch portions 50 and 51 and the lock protrusive portion 56 of the stopper member 6 are pushed downward in the direction as indicated by the solid arrow shown in FIG. 13 (D).

In the light of the foregoing description, one face of the lock protrusion portion 56 of the stopper member 6 abuts against the other face of the stopper protrusion portion 43 of the shaft 10. In other words, the stopper protrusion portion 44 and the lock protrusion portion 56 of the stopper member 6 sandwich the stopper protrusion portion 43 of the shaft 10 therebetween from both sides. As a result, the stopper member 6 is established in such a state as to be locked to the shaft 10, in other words, in such a state as to disable rotation with respect to the shaft 10.

In the above state, the gear case 11 rotates in the clockwise direction. After that, as shown in FIG. 1, the mirror assembly 4 rotates in the clockwise direction when seen in top view, from the use location A to the forward tilt location C, and as shown in FIG. 11 (C), at a time point at which the other abutment face 22 of the arc protrusion portion 21 of the shaft holder 9 abuts against the other abutment face 25 of the arc groove 24 of the gear case 11, the mirror assembly is positioned in the forward tilt location C. At this time, as shown in FIG. 13 (E), the stopper protrusion portion 44 and the lock protrusion portion 56 of the stopper member 6 sandwich the stopper protrusion portion 43 of the shaft 10 therebetween from both sides; and therefore, the stopper member 6 is established in such a state as to be locked to the shaft 10, in other words, in such a state as to disable rotation with respect to the shaft 10.

(Description of Restoration from Forward Tilt Location C to Use Location A)

Furthermore, a description will be given with respect to a case in which the mirror assembly 4 that is positioned in the forward tilt location C is restored to the use location A by means of electrically driven rotation or manually driven rotation, as shown in FIG. 1. In a state in which the mirror assembly 4 is positioned in the forward tilt location C (in the forward tilt state), the mirror assembly 4 is electrically driven or manually driven to be rotated in the counterclockwise direction. After that, the gear case 11 (including the cover 12, the motor 13, the deceleration mechanism 14, the bearing member 16, the clutch gear 32, and the clutch 33) that is mounted to the mirror assembly 4 rotates in the counterclockwise direction from the top (in the opposite direction to the direction as indicated by the solid arrow in the FIG. 11 (C) and FIG. 13 (D), in the direction as indicated by the solid arrow shown in FIG. 14 (A), and in the opposite direction to the direction as indicated by the solid arrow shown in FIG. 15 and FIG. 16).

Concurrently, the other abutment face 25 of the arc groove 24 of the gear case 11 deviates from the other abutment face 22 of the arc protrusion portion 21 of the shaft holder 9. In addition, as shown in FIG. 15 (A), the tilt faces 42 of the clutch protrusion portion 40 of the clutch 33 on the side of the gear case 11 is engaged with the tilt faces 38 of the clutch recessed portion 41 of the clutch holder 35 on the fixed side of the shaft 10 by means of the spring force of the spring 36. At this time, the clutch holder 35 moves (lowers) with respect to the shaft 10.

When the mirror assembly 4 is positioned (returned or restored) from the forward tilt location C to the use location A, as shown in FIG. 14 (A), the first notch portion 48 and the second notch portions 53 and 54 of the gear case 11 are positioned in such a manner as to be opposed to the first notch portion 47 and the second notch portions 50 and 51 of the stopper member 6. As a result, the thin portion 57 of the stopper member 6, which has been elastically deformed up to now, is elastically restored and then the second notch portions 50 and 51 and the lock protrusion portion 56 of the stopper member 6, which has been pushed downward by means of the bottom face of the gear case 11 up to now, rise in the direction as indicated by the solid arrow shown in FIG. 14 (A).

In the light of the foregoing description, as shown in FIG. 14 (B), one face of the lock protrusion portion 56 of the stopper member 6 deviates from the other face of the stopper protrusion portion 43 of the shaft 10. In this manner, the stopper member 6 is released from a state in which the stopper member has been locked to the shaft 10 and then is established in a state in which the stopper member is rotatable with respect to the shaft 10 between the use location A and the storage location B.

At the same time, the gear case 11 is moved (rotationally lowered) with respect to the stopper member 6 and the shaft 10 by means of the spring force of the spring 36 as indicated by the solid arrow shown in FIG. 14 (B). Concurrently, the tilt faces 34 of the first notch portion 48 and the tilt faces 55 of the second notch portions 53 and 54 of the gear case 11 engages with the tilt faces 28 of the first notch portion 47 and the tilt faces 52 of the second notch portions 50 and 51 of the stopper member 6. As a result, as shown in FIG. 1, the mirror assembly 4 is positioned in the use location A.

(Description of Tilt from Use Location A to Storage Location B for Buffering)

Furthermore, a description will be given with respect to a case in which the mirror assembly 4 that is positioned in the use location A is tilted to the storage location B for the sake of buffering, as shown in FIG. 1. A force in the counterclockwise direction when seen in top view, the force being greater than an electrically driven force, (in other words, a manually driven force or a force that is generated when something hits the mirror assembly 4) is applied to the mirror assembly 4 that is positioned in the use location A. After that, the gear case 11 that is mounted to the mirror assembly 4 is about to rotate in the counterclockwise direction when seen in top view. At this time, the clutch holder 35 is engaged with the shaft 10 in such a manner as to disable rotation; and therefore, the tilt faces 42 of the clutch protrusion portion 40 of the clutch 33 on the side of the gear case 11 push upward the clutch holder 35 on the fixed side of the shaft 10 and then the clutch protrusion portion 40 of the clutch 33 and the clutch recessed portion 41 of the clutch holder 35 disengage from each other. At this time, the clutch holder 35 moves (rises) against the spring force of the spring 36.

As a result, the gear case 11 (including the cover 12, the motor 13, the deceleration mechanism 14, the bearing member 16, the clutch gear 32, and the clutch 33) rotates in the counterclockwise direction when seen in top view. In this manner, as shown in FIG. 1, the mirror assembly 4 rotates in the counterclockwise direction when seen in top view, from the use location A to the storage location B, and then, one abutment face 22 of the arc protrusion portion 21 of the shaft holder 9 abuts against one abutment face 25 of the arc groove 24 of the gear case 11. As a result, rotation of the gear case 11 stops and then the mirror assembly 4 stops and is positioned in the storage location B.

Description of Restoration from Storage Location B to Use Location A

In the light of the foregoing description, as shown in FIG. 1, the mirror assembly 4 that is positioned in the storage location B is rotated in the clockwise direction when seen in top view, by means of an electrically driven rotation force or a manually driven force. After that, the gear case 11 (including the cover 12, the motor 13, the deceleration mechanism 14, the bearing member 16, the clutch gear 32, and the clutch 33) that is mounted to the mirror assembly 4 rotates in the clockwise direction when seen in top view and then as shown in FIG. 1, the mirror assembly 4 rotates in the clockwise direction when seen in top view, from the storage location B to the use location A.

After that, the tilt faces 42 of the clutch protrusion portion 40 of the clutch gear 32 engages with the tilt faces 38 of the clutch recessed portion 41 of the clutch holder 35 and then the clutch mechanism 15 is established in a continuous state. As a result, as shown in FIG. 1, the mirror assembly 4 is positioned in the use location A.

[Description of Advantageous Effects of First Embodiment]

The electrically driven storage type door mirror device 1 in the first embodiment is made of the constituent elements and functions as described above, and hereinafter, its related advantageous effects will be described.

The electrically driven storage type door mirror device 1 in the first embodiment is provided in such a manner that with regard to the first notch portion 47 of the stopper member 6 that serves as the first member of the first buffering mechanism 59 and the first notch portion 48 of the gear case 11 that serves as the second member, a plurality of, in this example, four tilt faces 28 and 34 are provided for a respective one of the notch portions. In addition, with regard to the clutch recessed portion 41 that serves as a notch portion of the clutch holder 35 that serves as the first member of the second buffering mechanism and the clutch protrusion portion 40 that serves as a notch portion of the clutch 33 that serves as the second member, a plurality of, in this example, two tilt faces 38 and 42 are provided for a respective one of the notch portions. As a result, the electrically driven storage type door mirror device 1 in the first embodiment is capable of lowering a facial pressure of a respective one of a plurality of tilt faces 28, 34, 38, and 42 of one notch portion more remarkably than a facial pressure of one tilt face of one notch portion; and therefore, it becomes possible to reduce a frictional wear and tear between the tilt faces 28 of the first notch portion 47 of the stopper member 6 that serves as the first member of the first buffering mechanism 59 and the tilt faces 34 of the first notch portion 48 of the gear case 11 that serves as the second member and between the tilt faces 38 of the clutch recessed portion 41 that serves as a notch portion of the clutch holder 35 that serves as the first member of the second buffering mechanism and the tilt faces 42 of the clutch protrusion portion 40 that serves as a notch portion of the clutch 33 that serves as the second member, without a need to use any other component.

The electrically driven storage type door mirror device 1 in the first embodiment is capable of reducing a frictional wear and tear between the tilt faces of notch portions; and therefore, the abrasion resistance properties on the tilt faces of the notch portions are improved. Therefore, in a case where the retaining force maintenance performance of the mirror assembly 4 is determined under an identical condition, the constituent members (the clutch holder 35, the clutch 33, the stopper member 6, and the gear case 11) can be reduced in size, and the electrically driven storage unit 3 can be reduced in size. Alternatively, in place of reduction in size, an inexpensive material for the constituent members (the clutch holder 35, the clutch 33, the stopper member 6, and the gear case 11) can be employed, and its related manufacturing costs can be reduced.

The electrically driven storage type door mirror device 1 in the first embodiment is provided in such a manner that even if the constituent members (the clutch holder 35, the clutch 33, the stopper member 6, and the gear case 11) is reduced in size, the abrasion resistance properties of the tilt faces of the notch portions are improved. Therefore, an external diameter of the shaft 10 can be increased in order to increase the number of harnesses to be inserted into the shaft 10, whereas the electrically driven storage unit 3 can be reduced in size.

In particular, the electrically driven storage type door mirror device 1 in the first embodiment i is optimal for a structure in which the notch portions 47, 50, 51, 48, 53, 54, 41, and 40 are provided on a narrow circular ring shaped face of the stopper member 6, the gear case 11, the clutch holder 35, and clutch 33 on which a space (an insert hole 19) through which the shaft 10 is to be inserted is provided at a center part.

Figure 17:
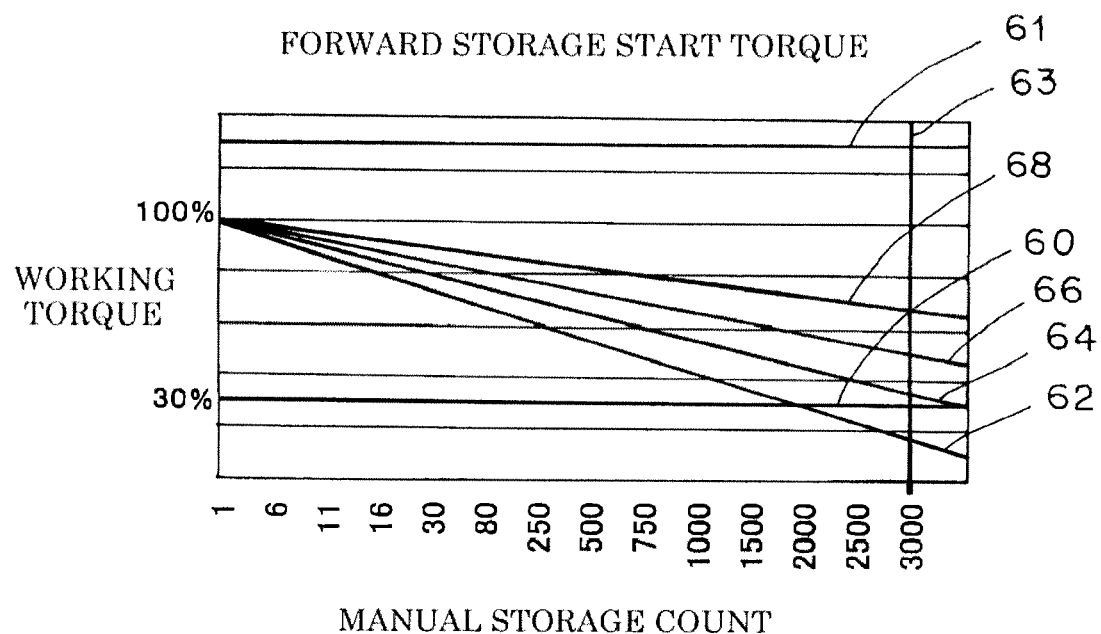
FIG. 17 is an explanatory view showing performance of the first buffering mechanism and the second buffering mechanism (the clutch mechanism) with respect to a frictional wear and tear.

(Description of Advantageous Effects with Reference to FIG. 17)

The electrically driven storage type door mirror device 1 in the first embodiment is capable of reducing a frictional wear and tear between the tilt faces of the notch portions; and therefore, as shown in FIG. 17, even after the elapse of an available period of time, a retaining force of the mirror assembly 4 can be maintained during a more extensive period of time. FIG. 17 is an explanatory view showing performance with respect to a frictional wear and tear between the first buffering mechanism 59 and the second buffering mechanism (the clutch mechanism). The vertical axis denotes a "working torque". The horizontal axis denotes a "manual storage count". Straight lines 62, 64, 66, and 68 of a graph indicate "forward storage start torques", and indicate that the manual storage count increases, whereby the working torque lowers. The straight line 62 denotes an approximate line of measured values in a case where two tilt faces of a notch portion are provided for a respective one of the constituent members. The straight line 64 denotes an approximate line of measured values in a case where four tilt faces of a notch portion are provided for a respective one of the constituent members. The straight line 66 denotes an approximate line of measured values in a case where six tilt faces of a notch portion are provided for a respective one of the constituent members. The straight line 68 denotes an approximate line of measured values in a case where eight tilt faces of a notch portion are provided for a respective one of the constituent members.

In FIG. 17, the straight line 60 indicates a "maximum electrically driven torque". The straight line 61 denotes a "safe torque at the time of contact". The straight line 63 denotes a "target working count (manual storage count)". The "forward storage start torque" used here in FIG. 17 denotes a working torque that is generated when the mirror assembly 4 is manually tilted from the use location A to the forward tilt location C, and the manual storage count increases, whereby the working torque lowers.

The "forward storage start torque" shown in FIG. 17 needs to be greater than the "maximum electrically driven torque" 60 shown in FIG. 17 (hereinafter, referred to as the electrically driven torque). This is because, if the "forward storage start torque" is smaller than the "maximum electrically driven torque" 60, the mirror assembly 4 is electrically driven to thereby tilt forward (to the forward tilt location C). In addition, the "safe torque at the time of contact" 61 shown in FIG. 17 is a torque to an extent such that even if the mirror assembly 4 hits an object, the mirror assembly 4 or object is not damaged. Further, the "target working count" 63 shown in FIG. 17 is greater than the count that is expected to be actually used in market, and is 3,000 in this example.

As indicated by the straight lines 62, 64, 66, and 68 shown in FIG. 17, the more tilt faces of a notch portion are provided for a respective one of the constituent members, the more remarkably the frictional wear and tear on the tilt faces of the notch portions can be reduced, and even after the elapse of an available period of time, the retaining force of the mirror assembly 4 can be maintained during a more extensive period of time.

(Description of Other Advantageous Effects)

Depending on a vehicle type, there may be a case in which the mirror assembly 4 rotates from the use location A to the forward tilt location C at an angle that exceeds 180 degrees. On the other hand, the first notch portion 48 and the second notch portions 53 and 54 of the gear case 11 and the first notch portion 47 and the second notch portions 50 and 51 of the stopper member 6 are provided in such a manner as to be point-symmetrical at an angle of 180 degrees around the rotation center O-O, as shown in FIG. 5 and FIG. 6. Therefore, when the mirror assembly 4 rotates from the use location A to the forward tilt location C at an angle of 180 degrees, there may be a case in which the tilt faces 34 of the first notch portion 48 of the gear case 11 and the tilt faces 55 of the second notch portions 53 and 54, which have run aground up to now, engage with the tilt face 28 of the first notch portion 47 and the tilt faces 52 of the second notch portions 50 and 51 of the stopper member 6 in a state in which a relative position is shifted at an angle of 180 degrees.

The electrically driven storage type door mirror device 1 in the first embodiment is provided in such a manner that as shown in FIG. 5 and FIG. 6, a length in a radial direction of one of the second notch portions 53 and 50 of the gear case 11 and the stopper member 6 is greater than a length in a radial direction of the other one of the second notch portions 54 and 51. In other words, one of the second notch portions 53 and 50 of the gear case 11 and the stopper member 6 exists outside from the rotation center O-O of the shaft 10 by the presence of the other one of the second notch portions 54 and 51. Therefore, even if the mirror assembly 4 rotates from the use location A to the forward tilt location C at an angle of 180 degrees, it becomes possible to prevent the second notch portion 53 of the gear case 11, which is one of the above two notch portions, from differently engaging with the other second notch portion 51 of the stopper member 6, or alternatively, to prevent the second notch portion 54 of the gear case 11, which is the other one of the above two second notches, from differently engaging with the second notch portion 50 of the stopper member 6, which is one of the two above second notch portions, in a state in which the other second notch portion 53 of the gear case 11 in a state in which a relative position is shifted at an angle of 180 degrees. It is to be noted that as described previously, in place of changing the length in the radial direction of the notch portion, a length in the circumferential direction of the notch portion is changed, thereby making it possible to prevent the incorrect engagement described previously.

(Advantageous Effects of Stopper Member Lock Mechanism)

While the mirror assembly 4 rotates from the use location A to the forward tilt location C and the mirror assembly 4 is rotationally restored from the forward tilt location C to the use location A, as shown in FIG. 13 (D), FIG. 13 (E), and FIG. 14 (A), one face of the lock protrusion portion 56 of the stopper member 6 abuts against the other face of the stopper protrusion portion 43 of the shaft 10 and then the stopper protrusion portion 44 and the lock protrusion portion 56 of the stopper member 6 sandwiches the stopper protrusion portion 43 of the shaft 10 therebetween from both sides, in other words, the stopper member 6 is established in such a state as to be locked to the shaft 10, and the stopper member 6 is established in such a state as to disable rotation with respect to the shaft 10.

The electrically driven storage type door mirror device 1 in the first embodiment is provided in such a manner that when the mirror assembly 4 is rotated and restored from the forward tit location C to the use location A, it becomes possible to reliably prevent the stopper member 6 from rotating together with the gear case 11, in accordance with a relative relationship in a friction between the stopper member 6 and the shaft 10 and a friction between the stopper member 6 and the gear case 11. As a result, the mirror assembly 4 can be reliably positioned in a predetermined use location A.

In other words, in a case where the stopper member lock mechanism is not provided, when the mirror assembly 4 is rotated and stored from the forward tilt location C to the use location A, there may be a case in which the stopper member 6 rotates together with the gear case 11 in accordance with the relative relationship in the friction between the stopper member 6 and the shaft 10 and the friction between the stopper member 6 and the gear case 11. In this case, the position of the use location A in which the mirror assembly 4 stops is shifted. However, the electrically driven storage type door mirror device 1 in the first embodiment is capable of reliably preventing a position shift of the use location A in which the mirror assembly 4 stops, by means of the stopper member lock mechanism.

[Description of Second Embodiment]

Figure 18:
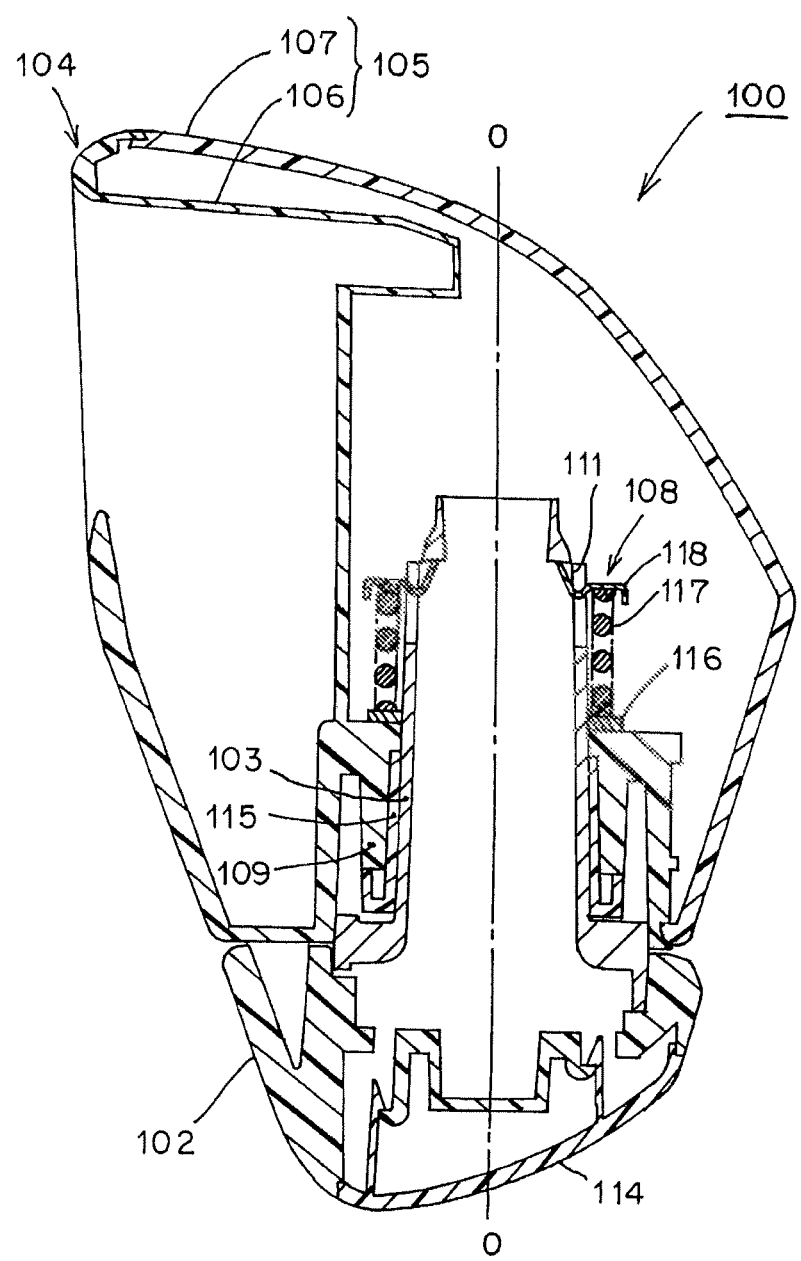
FIG. 18 is a longitudinal sectional view (a vertical sectional view) showing a second embodiment of a vehicle outside mirror device according to the present invention.
Figure 19:
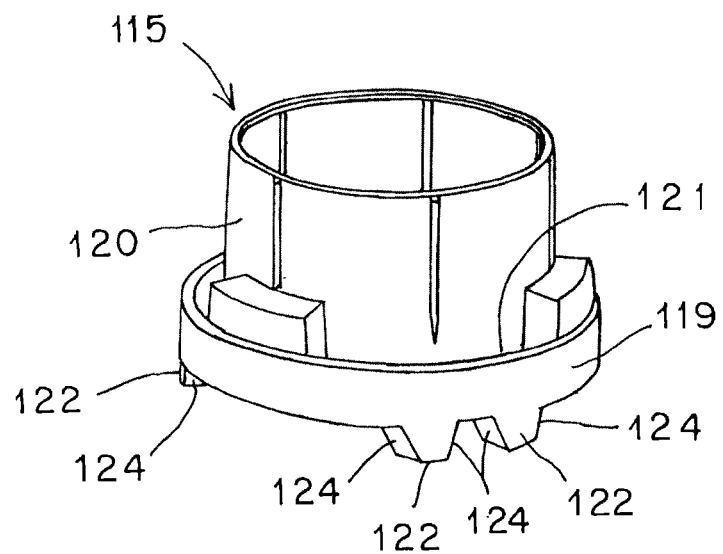
FIG. 19 is a perspective view of a notch portion.
Figure 20:
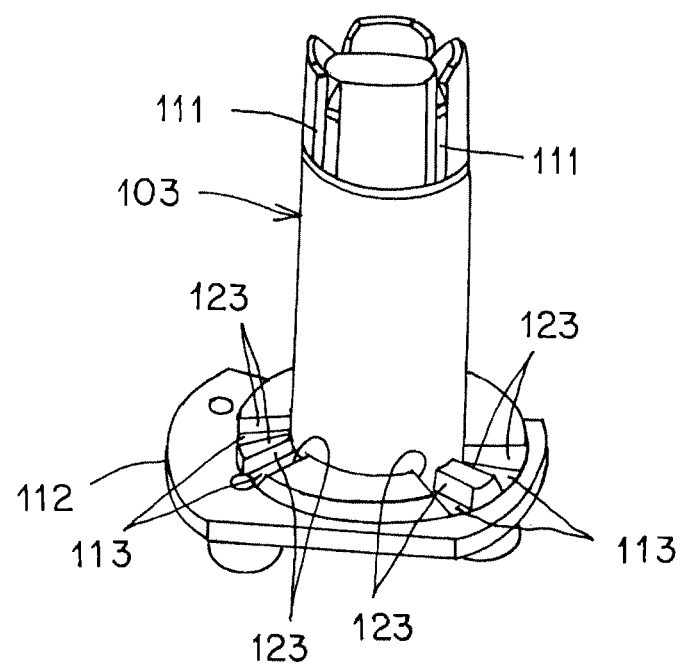
FIG. 20 is a perspective view of a shaft.

Each of FIG. 18 to FIG. 20 shows a second embodiment of a vehicle outside mirror device according to the present invention. Hereinafter, the vehicle outside mirror device in the second embodiment will be described. In the figures, like constituent elements shown in FIG. 1 to FIG. 17 are designated by like reference numerals.

[Description of Configuration of Second Embodiment]

The vehicle outside mirror device according to the first embodiment described previously is the electrically driven storage type door mirror device 1. On the other hand, the vehicle outside mirror device according to the second embodiment is a manually driven storage type door mirror device 100.

The manually driven storage type door minor device 100, as shown in FIG. 18, is provided with a base (a mirror base) 102 that is fixed to a vehicle body (a vehicle door); a shaft 103 that is fixed to the base 102; a mirror assembly 104 that is mounted to the shaft 103 in such a manner as to enable tilting; a clutch mechanism 108 that is provided between the shaft 103 on a fixed side and the mirror assembly 104 on a rotation side; and a buffering mechanism.

The mirror assembly 104 is made of a mirror housing 105, a power unit (not shown), and a mirror (a mirror unit), although not shown. The mirror housing 105 is made of: a main body portion 106 that is compatible with a mount bracket; and a cover portion 107 that is mounted to the main body portion 106. The power unit is mounted to the main body portion 106. The mirror is mounted to the power unit in such a manner as to enable tilting upward, downward, leftward, or rightward.

A housing portion 109 that engages from the outside (externally engages) with the shaft 103 in such a manner as to be rotatable around the rotation center O-O of the shaft 103 is integrally provided on the main body portion 106 of the mirror assembly 104. The housing portion 109 is formed in a sectional circular ring shaped cylinder portion. On one end face (a lower end face) of the housing portion 109, one or a plurality of fixing protrusion portions are integrally provided at equal intervals (at equal opening angles).

The shaft 103, as shown in FIG. 20, is formed in a hollow cylinder shape, and is configured in such a manner that a harness (not shown) is inserted through the shaft. A groove 111 is provided at an upper end part of the shaft 103. A shaft holder 112 is integrally provided at a lower end part of the shaft 103.

On one face (a top face) of the shaft holder 112, one or a plurality of, in this example, three (three sets of) clutch recessed portions 113 are integrally provided at equal intervals (at equal opening angles). A tilt face (a notch face) 123 is provided on a respective one of both side faces of the three clutch recessed portions 113. As far as the three clutch recessed portions 113 are concerned, a plurality of, in this example, two tilt faces 123 in the clockwise direction when seen in planar view and two tilt faces 123 in the counterclockwise direction when seen in planar view are provided for a respective one of the clutch recessed portions 113. In other words, the two small recessed portions are provided for a respective one of the three clutch recessed portions 113, and the tilt faces 123 are provided on a respective one of both side faces of the two small recessed portions. In the shaft holder 112, a total number of the tilt faces 123 in the clockwise direction when seen in planar view is 6, and a total number of the tilt faces 123 in the counterclockwise when seen in planer view is 6. Namely, a plurality of the clutch recessed portions 113, a respective one of which is made of the two small recessed portions, constitute one set of the clutch recessed portions 113.

The shaft holder 112 of the shaft 103 is fixed to the base 102 by means of screw (not shown) or the like. The base 102 is fixed to the door. A cover 114 is mounted to a lower part of the base 102.

The housing portion 109 of the mirror assembly 104 externally engages with the shaft 103 in such a manner as to be rotatable around the rotation center O-O of the shaft 103. As a result, the mirror assembly 104 is mounted to the shaft 103 in such a manner as to enable tilting, and is mounted to the door in such a manner as to enable tilting.

The clutch mechanism 108 is provided with a notch member 115, a washer 116, a spring 117, and a push nut 118. The clutch mechanism 108 is provided between a respective one of the shaft 103 on a fixed side and the mirror assembly 104 on a rotation side.

The notch member 115 is interposed between the shaft 103 on the fixed side and the housing portion 109 of the mirror assembly 104 on the rotation side. The notch member 115 is adapted to stabilize a torque of the clutch mechanism 108.

The washer 116 is interposed between the housing portion 109 of the mirror assembly 104 and the spring 117. The washer 116 is adapted for the mirror assembly 104 to rotate (smoothly) without any problem with respect to the spring 117.

The spring 117 externally engages with the shaft 103, and is interposed between the push nut 118 of the shaft 103 on the fixed side and the washer 116 of the housing portion 109 of the mirror assembly 104 on the rotation side. The spring 117 is adapted to obtain an appropriate retaining force in such a manner that a mirror face (a mirror surface) of the mirror assembly 104 does not move while in vehicle traveling or the like.

The push nut 118 is engagingly fixed to the groove 111 of the shaft 103. The push nut 118 is adapted to retain a resilient force of the spring 117.

The notch member 115, as shown in FIG. 19, is made of a notch portion 119 and a cylinder portion 120. The cylinder portion 120 is formed in a sectional circular cylinder shape. The notch portion 119 is integrally provided at one end part (a lower end part) of the cylinder portion 120.

A fixing recessed portion 121 to which the fixing protrusion portion of the housing portion 109 of the mirror assembly 104 is to be engagingly fixed is provided on one face (a top face) side of the notch member 119. One or a plurality of, in this example, the three fixing recessed portions 121 are provided at equal intervals (at equal opening angles) in correspondence with the fixing protrusion portions. The fixing protrusion portions of the housing 109 of the mirror assembly 104 are engagingly fixed to the fixing recessed portions 121 of the notch portion 119 of the notch member 115.

A clutch protrusive portion 122 is integrally provided on the other face (a lower face) side of the notch portion 119. One or a plurality of, the three (three set of) clutch protrusion portions 112 are provided at equal intervals (at equal opening angles) in correspondence with the clutch recessed portions 113. On both side faces of the three clutch protrusion portions 112, tilt faces (notch faces) 124 are respectively provided in correspondence with the tilt faces 123 of the shaft holder 112. As far as the three clutch protrusion portions 122 is concerned, a plurality of, in this example, two tilt faces 124 in the clockwise direction when seen in a planar view and two tilt faces 124 in the counterclockwise direction when seen in planar view are provided for a respective one of the clutch protrusion portions 122. In other words, two small protrusion portions are provided for a respective one of the three clutch protrusion portions 122, and the tilt faces 124 are provided on a respective one of both side faces of the two small protrusion portions. In the notch member 115, a total number of the tilt faces 124 in the clockwise direction when seen in planar view is 6, and a total number of the tilt faces 124 in the clockwise direction when seen in planar view is 6. Namely, a plurality of the clutch protrusion portions 122, each of which is made of the two small protrusion portions constitute one set of the clutch protrusion portions 122.

The tilt faces 124 of the clutch protrusion portion 122 of the notch portion 119 of the notch member 115 removably engage with the tilt faces 123 of the clutch recessed portion 113 of the shaft holder 112 of the shaft 103.

The shaft holder 112 configures a first member of the buffering mechanism. The notch member 115 configures a second member of the buffering mechanism. The spring 117 of the clutch mechanism 108 configures a spring of the buffering mechanism.

The shaft holder 112, the notch member 115, and the spring 117 configures the buffering mechanism. In other words, when the mirror assembly 104 is positioned in a use location, the tilt faces 123 of the shaft holder 112 and the tilt faces 124 of the notch member 115 is caused to abut against each other by means of a spring force of the spring 117. When a force that is equal to or greater than the spring force of the spring 117 acts on the mirror assembly 104, the tilt faces 124 of the notch member 115 on the side of the mirror assembly 104 run aground along the tilt faces 123 of the shift holder 112 on the side of the shaft 103 against the spring force of the spring 117. When the tilt faces 124 of the notch member 115 run aground along the tilt faces 123 of the shaft holder 112, the mirror assembly 104 rotates forward or backward from the use location around the rotation center O-O of the shaft 103 with respect to the shaft 103 for the sake of buffering.

[Description of Function of Second Embodiment]

The manually driven storage type door mirror device 100 in the second embodiment is made of the constituent elements as described above, and hereinafter, its related functions will be described.

In general, the tilt faces 124 of the clutch protrusion portion 122 of the clutch mechanism 108 and the tilt faces 123 of the clutch recessed portion 113 of the shaft 103 are caused to engage with each other by means of the spring force of the spring 117 of the buffering mechanism. As a result, the mirror assembly 104 is positioned in a use location. The mirror assembly 104 that is positioned in the use location is about to rotate with a force that is equal to or greater than the spring force of the spring 117. After that, the tilt faces 124 of the notch member 115 run aground along the tilt faces 123 of the shaft holder 112 against the spring force of the spring 117. When the tilt faces 124 of the notch member 115 run aground along the tilt faces 123 of the shaft holder 112, the mirror assembly 104 rotates forward or backward from the use location around the rotation center O-O of the shaft 103 with respect to the shaft 103 for the sake of buffering.

[Description of Advantageous Effects of Second Embodiment]

The manually driven storage type door mirror device 100 in the second embodiment is made of the constituent elements and functions as described above; and therefore, it becomes possible to achieve functions and advantageous effects that are substantially identical to those of the electrically driven storage type door mirror device 1 according to the first embodiment described previously.

In other words, the manually driven storage type door mirror device 100 in the second embodiment is provided in such a manner that with regard to the clutch recessed portion 113 that serves as a notch portion of the shaft holder 112 that serves as the first member of the buffering mechanism and the clutch protrusion portion 122 that serves as a notch portion of the notch member 115 that serves as the second member, a plurality of, in this example, two tilt faces 123 and 124 are provided for a respective one of the notch portions. As a result, the manually driven storage type door mirror device 100 in the second embodiment is capable of lowering a facial pressure of a respective one of the plurality of tilt faces 123 and 124 of one notch portion more remarkably than a facial pressure of one tilt face of one notch portion; and therefore, it becomes possible to reduce a frictional wear and tear between the tilt faces 123 of the shaft holder 112 that serves as the first member of the buffering mechanism and the tilt faces 124 of the notch member 115 that serves as the second member without a need to use any other component.

As is the case with the electrically driven storage type door mirror device 1 in the first embodiment described previously, the manually driven storage type door mirror device 100 in the second embodiment is provided in such a manner that three (three sets of) clutch recessed portions 113 and three clutch protrusion portions 122 (two small recessed portions of the clutch recessed portion 113 and two small protrusion portions of the clutch protrusion portion 122) are disposed at the inside and outside with respect to the rotation center O-O of the shaft 10, or alternatively, a length in a circumferential direction is changed, thereby making it possible to prevent incorrect coupling between the clutch recessed portion 113 and the clutch protrusion portion 122.

[Description of Examples Other than First and Second Embodiments]

The first embodiment describes an electrically driven storage type door mirror device. However, the present invention can be applied to a vehicle outside mirror device other than such an electrically driven storage type door mirror device as well. For example, the present invention can be applied to a vehicle outside mirror device of an electrically driven storage type such as a vehicle fender mirror device of an electrically driven storage type.

In addition, in the first embodiment described previously, with respect to the first notch portion 47 of the stopper member 6 of the first member and the first notch portion 48 of the gear case 11 of the second member of the first buffering mechanism 59, four tilt faces 28 and 34 are provided for a respective one of the notch portions, whereas with respect to the clutch recessed portion 41 that serves as a notch portion of the clutch holder 35 that serves as the first member of and the clutch protrusion portion 40 that serves as a notch portion of the clutch 33 that serves as the second member in the clutch mechanism 15 that serves as the second buffering mechanism, two tilt faces 38 and 42 are provided for a respective one of the notch portions. However, in the present invention, it may be that there are a plurality of tilt faces of the first notch portion 47 of the stopper member 6 and the first notch portions 48 of the gear case 11 of the first buffering mechanism 9, whereas there is provided one tilt face of a respective one of the clutch recessed portion 41 that serves as a notch portion of the clutch holder 35 and the clutch protrusive portion 40 that serves as a notch portion of the clutch 33 of the clutch mechanism 15 of the second buffering mechanism. Alternatively, conversely, it may be that there is provided one tilt face of a respective one of the first notch portion 47 of the stopper member 6 and the first notch portion 48 of the gear case 11 of the first buffering mechanism 59, whereas there are provided a plurality of tilt faces of the clutch recessed portion 41 of the clutch holder 35 and the clutch protrusion portion 40 of the clutch 33 of the clutch mechanism 15 of the second buffering mechanism.

Further, the second embodiment describes a manually driven storage type door mirror device. However, the present invention can be applied to a vehicle outside mirror device other than such a manually driven storage type door mirror device. For example, the present invention can be applied to a vehicle outside mirror device of a manually driven storage type such as a vehicle fender mirror device of a manually driven storage type.

What is claimed is:

1. A vehicle outside mirror device comprising:
   a base that is fixed to a vehicle body;
   an electrically driven storage unit; and
   a mirror assembly that is mounted to the base so as to be rotatable via the electrically driven storage unit,
   wherein the electrically driven storage unit comprises a shaft that is fixed to the base, a casing which is mounted to the shaft so as to be rotatable and to which the mirror assembly is mounted, a first buffering mechanism, a motor, a rotation force transmission mechanism, and a second buffering mechanism,
   wherein the first buffering mechanism is a mechanism which is made of a first member, a second member that is the casing, and a spring, and in which a notch portion having a tilt face is provided in each of the first member and the second member, when the mirror assembly is positioned between a use location and a storage location, the tilt face of the first member and the tilt face of the second member are caused to abut against each other by means of a spring force of the spring, and when the mirror assembly rotates forward from the use location with respect to the shaft for buffering, the tilt face of the second member runs aground along the tilt thee of the first member against the spring force of the spring,
   wherein the second buffering mechanism is a mechanism which is made of a first member that is disabled from rotating with respect to the shaft, a second member that is rotatable with respect to the shaft, and the spring, and in which a notch portion having a tilt face is provided in each of the first member and the second member, the tilt face of the first member and the tilt face of the second member are caused to abut against each other by means of the spring force of the spring, when the mirror assembly rotates with a force that is equal to or greater than an electrically driven rotation force of the electrically driven storage unit, the tilt thee of the second member runs aground along the tilt thee of the first member against the spring force of the spring, and
   wherein with regard to at least either one of a set of the notch portion of the first member and the notch portion of the second member of the first buffering mechanism and a set of the notch portion of the first member and the notch portion of the second member of the second buffering mechanism, a plurality of the tilt faces are provided for each of the notch portions, by continuously forming a plurality of small protrusion portions or a plurality of small recessed portions.

2. A vehicle outside mirror device comprising:
   a base that is fixed to a vehicle body;
   a shaft that is fixed to the base; and
   a mirror assembly that is mounted to the shaft so as to be rotatable via a buffering mechanism,
   wherein the buffering mechanism is a mechanism which is made of a first member that is disabled from rotating with respect to the shaft, a second member that is rotatable with respect to the shaft, and a spring, and in which a notch portion having a tilt face is provided for each of the first member and the second member, when the mirror assembly is positioned in a predetermined location with respect to the shaft, the tilt face of the first member and the tilt face of the second member are caused to abut against each other by means of a spring force of the spring, and when the mirror assembly rotates with respect to the shaft for buffering, the tilt face of the second member runs aground along the tilt face of the first member against the spring force of the spring, and
   wherein with regard to the notch portion of the first member and the notch portion of the second member, a plurality of the tilt faces are provided for each of the notch portions, by continuously forming a plurality of small protrusion portions or a plurality of small recessed portions.

3. The vehicle outside mirror device of claim 1, wherein the first member of the first buffering mechanism has a first notch portion and a second notch portion, each with a plurality of tilt faces, wherein an axial height of the second notch portion is less than that of the first notch portion.

* * * * *